United States Patent

Onizuka et al.

[11] Patent Number: 5,835,383
[45] Date of Patent: Nov. 10, 1998

[54] SYSTEM-INTERCONNECTED GENERATOR FOR CONVERTING SOLAR ENERGY TO AC POWER

[75] Inventors: Keigo Onizuka, Gunma; Masaki Madenokouji, Honjo; Hisashi Tokizaki, Gunma, all of Japan

[73] Assignee: Sanyo Electric Co., Ltd., Osaka, Japan

[21] Appl. No.: 799,172

[22] Filed: Feb. 14, 1997

[30] Foreign Application Priority Data

Feb. 26, 1996 [JP] Japan .................................. 8-038537
Jul. 12, 1996 [JP] Japan .................................. 8-183570

[51] Int. Cl.⁶ .............................. H02J 3/12; H02J 3/00
[52] U.S. Cl. ............................. 364/528.32; 364/528.21; 364/528.26; 364/528.3; 307/86
[58] Field of Search ........................... 364/528.32, 528.3, 364/528.21, 528.26; 323/299, 906; 307/20, 21, 23, 38, 39, 40, 45, 46, 64, 66, 130, 151, 126, 86, 85; 62/235.1, 236; 363/34

[56] References Cited

U.S. PATENT DOCUMENTS

| | | | |
|---|---|---|---|
| 4,103,493 | 8/1978 | Schoenfelder | 60/641.11 |
| 4,333,136 | 6/1982 | Baker | 307/87 |
| 4,556,049 | 12/1985 | Tchernev | 126/620 |
| 4,697,136 | 9/1987 | Ishikawa | 323/267 |
| 4,725,740 | 2/1988 | Nakata | 307/64 |
| 4,750,102 | 6/1988 | Yamano et al. | 363/142 |
| 5,375,429 | 12/1994 | Tokizaki et al. | 62/235.1 |
| 5,493,155 | 2/1996 | Okamoto et al. | 307/45 |
| 5,560,218 | 10/1996 | Jang | 323/906 |
| 5,569,998 | 10/1996 | Cowan | 307/66 |
| 5,661,349 | 8/1997 | Luck | 307/151 |

*Primary Examiner*—Parshotam S. Lall
*Assistant Examiner*—Cuong H. Nguyen
*Attorney, Agent, or Firm*—Darby & Darby

[57] ABSTRACT

A system-interconnected generator permits effective use of surplus power generated by a solar battery for operating electric equipment such as an air conditioner. The system-interconnected generator having a power converter for converting solar energy to AC power and supplying the AC power to a system on a commercial AC power supply so as to make it possible to sell the power to the system is equipped with: a storing section for storing an integrated value of the AC power which has been converted from solar energy by the power converter; a correcting section for subtracting a value of power, which is consumed by particular electric equipment receiving power supplied from the system, from the integrated value stored in the storing section; and a demanding section for enabling a demanding function of the electric equipment when the integrated value stored in the storing section becomes smaller than a predetermined value.

6 Claims, 17 Drawing Sheets

SYSTEM-INTERCONNECTED GENERATOR FOR CONVERTING SOLAR ENERGY TO AC POWER

BACKGROUND OF THE INVENTION

1. Field of the Invention

The present invention relates to a system-interconnected generator which converts solar energy to AC power and supplies it to a commercial AC power system and, more particularly, to a system-interconnected generator intended for controlling the cumulative total of power, which is consumed over a predetermined period of time by electric equipment connected to the system, within the power generated by the system-interconnected generator.

2. Description of Related Art

As a conventional power generating apparatus which employs solar energy, there is one described in Japanese Unexamined Patent Publication No. 6-74522.

The conventional power generating apparatus described in the foregoing Japanese Unexamined Patent Publication combines a solar battery and an air conditioner; when the solar battery is effectively working, the priority is given to using the output of the solar battery to operate the air conditioner.

In the case of the air conditioner which is configured as described above and which employs the conventional solar battery, the power generated by the solar battery depends on weather or time, and when the power generated by the solar battery is insufficient, the power is supplied from a system on a commercial power supply to make up for the shortage. When the air conditioner is not in operation, the output of the solar battery is wasted, inevitably leading to poor utilization of the solar battery.

SUMMARY OF THE INVENTION

Accordingly, it is an object of the present invention to provide a system-interconnected generator for effectively utilizing surplus power, which is generated by a solar battery, for operating an air conditioner or other electric equipment.

To this end, according to one aspect of the present invention, there is provided a system-interconnected generator which has a power converter for converting solar energy to AC power and which supplies the AC power to a system on a commercial AC power supply so as to make it possible to sell the power to the system, the system-interconnected generator being equipped with: a storing section for storing an integrated value of the AC power which has been converted from solar energy by the power converter; a correcting section for subtracting a value of power, which is consumed by particular electric equipment receiving power from the system, from the integrated value stored in the storing section; and a demanding section for enabling a demanding function of the electric equipment when the integrated value stored in the storing section becomes smaller than a predetermined value. With this arrangement, the demanding function can be implemented so that the power consumed for operating the particular electric equipment stays within a cumulative total of the sold power supplied by the system-interconnected generator.

According to another aspect of the present invention, there is provided a system-interconnected generator having a power converter for converting solar energy to AC power and supplying the obtained AC power to a system on a commercial AC power supply so as to make it possible to sell the power to the system, the system-interconnected generator being equipped with: a storing section for storing an integrated value of the AC power which has been converted from solar energy by the power converter; a correcting section for subtracting a value of power, which is consumed by particular electric equipment receiving power supplied from the system, from the integrated value stored in the storing section; and a demanding section for issuing a demand signal to the electric equipment every time the integrated value stored in the storing section becomes smaller than a plurality of preset values. With this arrangement, the power consumed by the electric equipment can be adjusted by issuing the demand signal according to the decrement of the integrated value of the sold power so that the power for operating the electric equipment stays within the cumulative total of the sold power supplied by the system-interconnected generator.

According to still another aspect of the present invention, there is provided a system-interconnected generator having a power converter for converting solar energy to AC power and supplying the AC power to a system on a commercial AC power supply so as to make it possible to sell the power to the system, the system-interconnected generator being equipped with: a storing section for storing an integrated value of the AC power which has been converted from solar energy by the power converter; a correcting section for subtracting a value of power, which is consumed by an air conditioner receiving power supplied from the system, from the integrated value stored in the storing section; and a demanding section for issuing a signal to the air conditioner to lower the operating capability thereof in steps within a range which exceeds a preset operating capability every time the integrated value stored in the storing section becomes smaller than any one of a plurality of preset values. With this arrangement, the operating capability of the air conditioner can be adjusted by issuing the demand signal according to the decrement of the integrated value of the sold power so that the power consumed for operating the air conditioner stays within the cumulative total of the sold power supplied by the system-interconnected generator.

According to a further aspect of the present invention, there is provided a system-interconnected generator having a power converter for converting solar energy to AC power and supplying the AC power to a system on a commercial AC power supply, the system-interconnected generator being equipped with: a storing section for storing an integrated value of the AC power which has been converted from solar energy by the power converter; a correcting section for subtracting a value of power, which is consumed by electric equipment receiving power supplied from the system, from the integrated value stored in the storing section; and a demanding section for enabling a demanding function of the electric equipment when the integrated value stored in the storing section becomes smaller than a predetermined value. With this arrangement, the demanding function can be implemented so that the power for operating the electric equipment stays within a cumulative total of the power supplied from the system-interconnected generator.

According to a still further aspect of the present invention, there is provided a system-interconnected generator having a power converter for converting solar energy to AC power and supplying the AC power to a system on a commercial AC power supply so as to make it possible to sell the power to the system, the system-interconnected generator being equipped with: a storing section for storing an integrated value of the power which has been sold to the system out of the AC power converted from the solar energy by the power converter; a correcting section for subtracting a value of power, which is consumed by particular electric equipment receiving power supplied from the system, from the integrated value stored in the storing section; and a controller which enables the operation of the electric equipment while the integrated value stored in the storing section is greater than zero. This arrangement makes it possible to control the power for operating the electric equipment within the power generated by the system-interconnected generator.

In a preferred form of the present invention, the system-interconnected generator is designed so that the operation of the electric equipment is started at a predetermined cycle if the integrated value is larger than zero. This arrangement allows the electric equipment to be automatically operated periodically without exceeding the power generated by the system-interconnected generator.

DETAILED DESCRIPTION OF THE PREFERRED EMBODIMENTS

The embodiments of the present invention will now be described with reference to the accompanying drawings.

Figure 1:
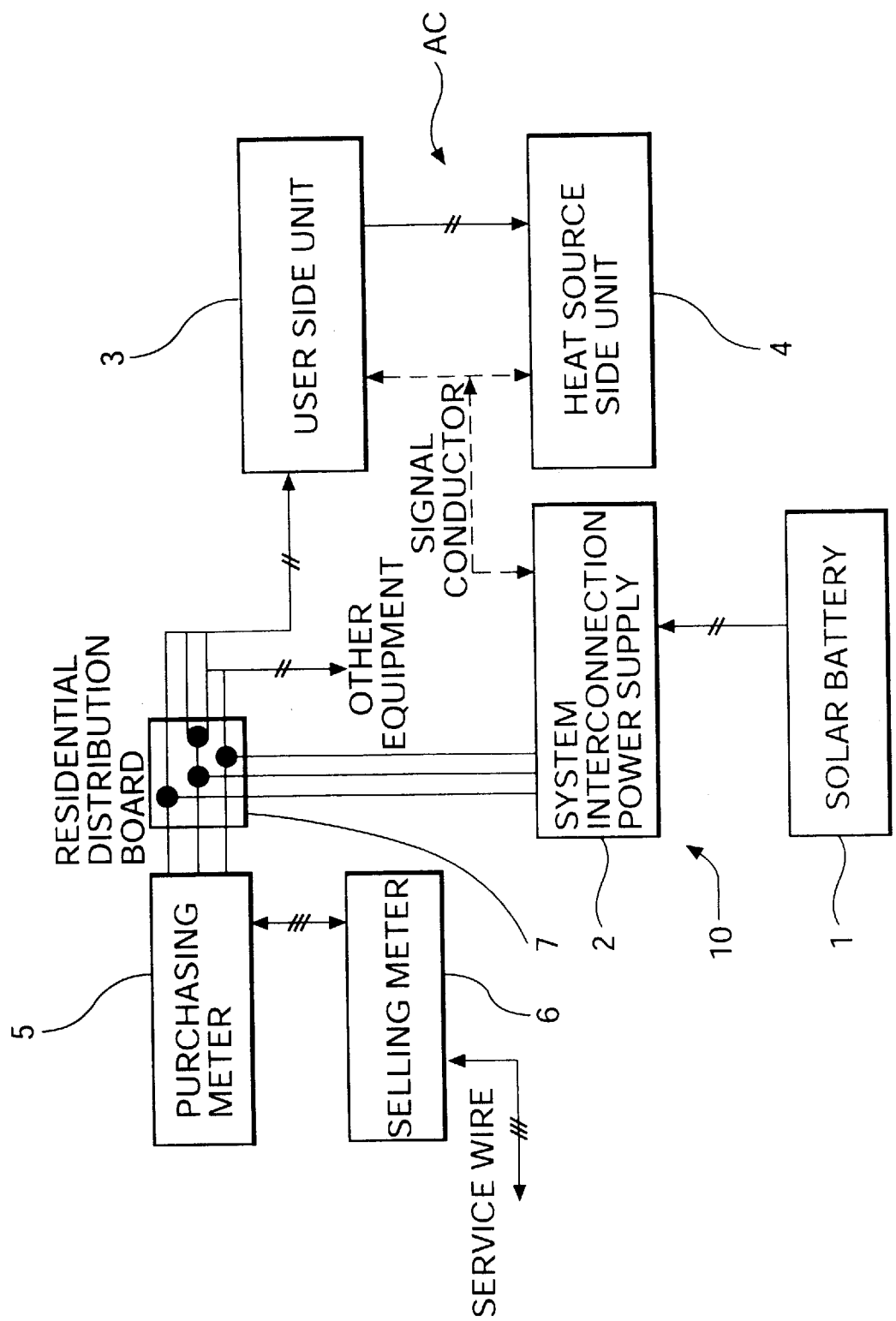
FIG. 1 is a schematic diagram illustrative of a system-interconnected generator in accordance with the present invention and an air conditioner.

FIG. 1 is a schematic diagram showing the relationship between a system-interconnected generator 10 in accordance with the present invention, which is composed of a solar battery 1 and a system interconnection power supply 2, and an air conditioner AC which is composed of a user side unit 3 and a heat source side unit 4.

In the drawing, the system interconnection power supply 2 converts the solar energy produced by the solar battery 1 to predetermined AC power (single-phase, three-wire system, 200 V) and connects it to a system on a commercial power supply. As mentioned above, the solar battery 1 and the system-interconnection power supply 2 constitute the system-interconnected generator 10.

The user side unit 3 is installed in a room to be air-conditioned; the user side unit 3 and the heat source side unit 4 together compose the separable type air conditioner AC. The AC power is supplied from the user side unit 3 to the heat source side unit 4; the user side unit 3 and the heat source side unit 4 exchange control data via a signal conductor.

A signal conductor of the system interconnection power supply 2 is connected to the foregoing signal conductor so as to enable the system interconnection power supply 2, the user side unit 3, and the heat source side unit 4 to exchange data.

A purchasing meter 5 and a selling meter 6 are connected in series via a service wire to a system such as a transformer installed on a utility pole of a commercial AC power supply. The purchasing meter 5 indicates the amount of power purchased by a user from the system, while the selling meter 6 indicates the amount of power sold to the system from the user.

A residential distribution board 7 is connected in series next to the purchasing meter 5 and the selling meter 6; it distributes power to respective electric appliances in the house of the user. The residential distribution board 7 converts a single-phase, three-wire, 200-volt AC power to a single-phase, 100-volt AC power.

The output of the system interconnection power supply 2 is supplied to the residential distribution board 7 (substantially between the purchasing meter 5 and the residential distribution board 7). Surplus generated power which is not used in the house is supplied to the system via the selling meter 6 and the purchasing meter 5. The power can be supplied to the system by setting the voltage of the AC power supplied from the system interconnection power supply 2 at a higher level than the voltage of the system.

Figure 2:
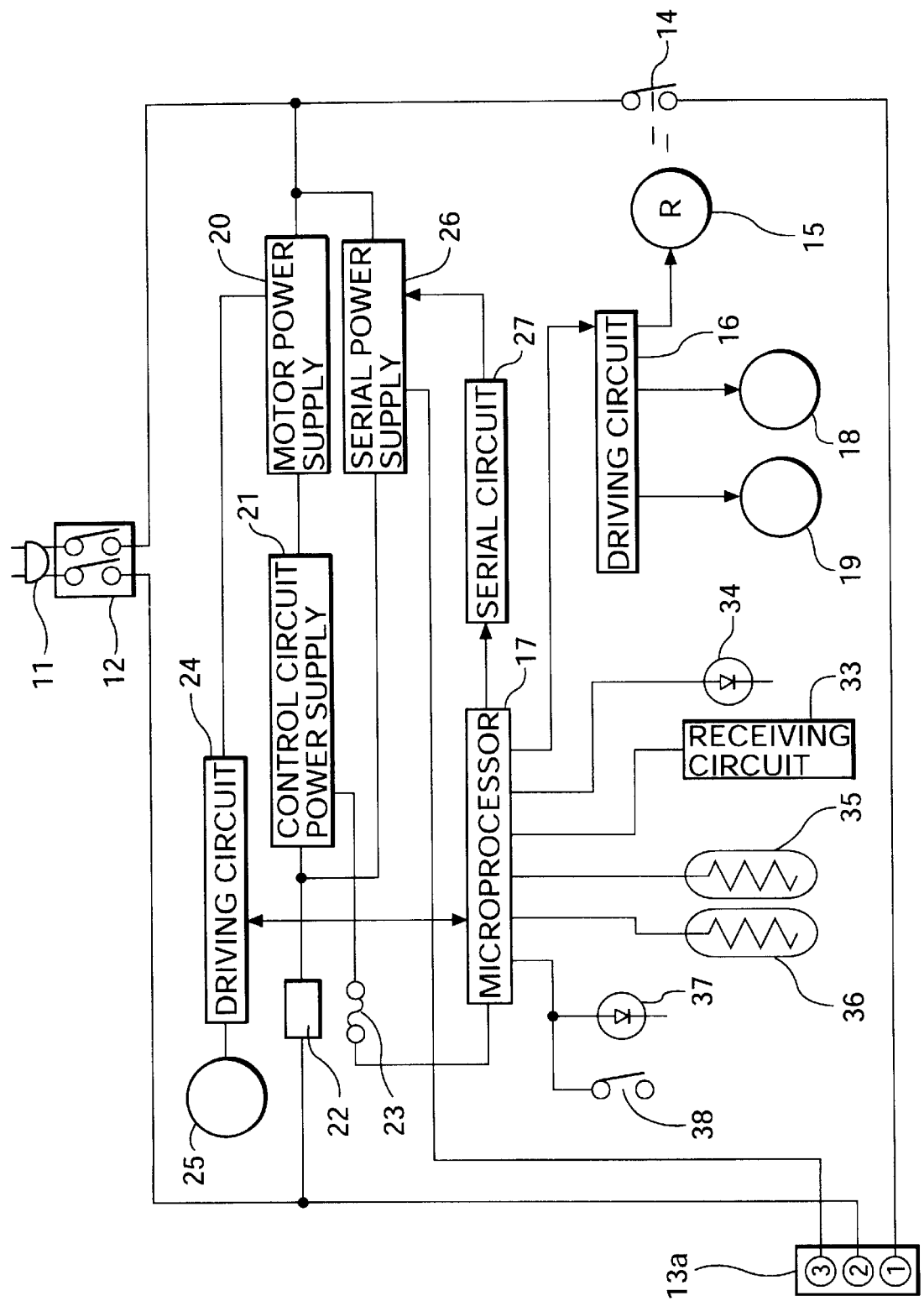
FIG. 2 is a block diagram showing a control circuit of a user side unit of the air conditioner.

FIG. 2 is a block diagram showing the control circuit of the user side unit 3. In the drawing, a plug 11 is used to receive the single-phase, 100-volt AC power supplied through the residential distribution board 7.

A connector 13a enables the supply of the AC power from the user side unit 3 to the heat source side unit 4 and also enables the exchange of control data among the system interconnection power supply 2, the user side unit 3, and the heat source side unit 4. More specifically, the terminals of the connector 13a and the terminals of a connector 13b (mounted on the heat source side unit 4) which share the same terminal numbers are electrically connected. A terminal ② and a terminal ③ of a connector 13c extending from the system interconnection power supply 2 are connected to the terminals ③ of the connector 13a and the connector 13b, respectively.

When a normally-open armature 14 of a power relay 15 closes, the AC power supplied through the plug 11 is applied between a terminal ① and the terminal ② of the connector 13a.

A driving circuit 16, typically a general-purpose buffer circuit or driver circuit, operates in response to an output received from a microprocessor 17 such as a general-purpose microprocessor which has a plurality of analog-to-digital conversion input terminals and I/O terminals, etc.; it energizes the power relay 15 in response to an output of the microprocessor 17. The power relay 15 is energized when the microprocessor 17 decides that the air conditioner AC can be operated normally.

A vertical flap motor 18 composed of a stepping motor or the like changes, according to the number of steps, the angle of a vertical flap so as to change the blowing direction of conditioned air to be discharged into a room from the user side unit 3. To be more specific, the flap motor rotates by one step in the forward or reverse direction in response to each pulse for the forward or reverse rotation received from the microprocessor 17. Thus, the angle of rotation, i.e. the angle of the flap, can be obtained, the angle corresponding to the number of output pulses stored in the microprocessor 17.

The microprocessor 17 first issues the pulses necessary for the flap motor 18 to reach a preset angle of the initial position and then makes the flap fully open or closed; based on this position of the flap, the microprocessor 17 establishes the relationship between the angle of the flap and the number of pulses thereafter.

To set the flap at a desired angle, the microprocessor 17 issues the pulses until the angle of the flap reaches the angle set by a remote controller. In an automatic setting mode, the microprocessor 17 automatically increases or decreases the number of steps to swing the flap. The swing range is set such that it differs between cooling mode and heating mode.

A horizontal flap motor 19 composed of a stepping motor or the like functions to change, according to the number of steps, the angle of a horizontal flap so as to change the blowing direction of conditioned air to be discharged into a room from the user side unit 3. The operation of the flap motor 19 is the same as that of the flap motor 18.

Hence, the discharging direction of the conditioned air supplied through the user side unit 3 can be set vertically and horizontally as desired by controlling the flap motor 18 and the flap motor 19.

A motor power supply 20, a control circuit power supply 21, and a current fuse 22 are connected in series to a commercial AC power supply via a plug 11. The fuse 22 is a thermal fuse which melts to cut off the supply of power from the control circuit power supply 21 to the microprocessor 17 if the temperature in the user side unit 3 or the ambient temperature of the electronic components of the microprocessor 17 or the like has risen.

The motor power supply 20 outputs, for example, a constant voltage of 48 VDC or 12 VDC; the 48 VDC constant voltage is supplied to a driving circuit 24, while the 12 VDC constant voltage is supplied to the control circuit power supply 21 and it also serves as the driving power supply for the power relay 15 and the stepping motors 18 and 19. The control circuit power supply 21 outputs a constant voltage of 5 V for the electronic components.

The driving circuit 24 drives a fan motor 25 which is a brushless DC motor driving a fan for discharging conditioned air into a room; it is composed of six switching elements such as power transistors and power FETs which are connected in a three-phase bridge so that it repeatedly supplies three-phase alternating currents for 120 degrees and also repeatedly cuts off the supply of the currents for 60 degrees by turning the switching elements ON/OFF.

One cycle of the three-phase alternating currents is divided into six different electric current supply patterns at every 60 degrees; each time a rotor turns 60 degrees, the electric current supply pattern changes in sequence, and the three-phase alternating currents for one cycle are output as the rotor makes one rotation. This means that the rotation of the rotor is continued by changing the electric current supply pattern in sequence according to the rotational position of the rotor.

The number of revolutions of the fan motor 25 can be changed by changing the applied DC voltage because it is a DC motor; it increases as the applied voltage is increased, while it decreases as the applied voltage is decreased. Specifically, the 48 VDC voltage supplied by the motor power supply 20 may be chopped to change the applied voltage, or the three-phase alternating currents supplied for 120 degrees to the fan motor 25 may be chopped at a predetermined ON duty and the ON duty may be changed to change the substantial applied voltage. In this case, increasing the ON duty increases the applied voltage, while decreasing the ON duty decreases the applied voltage.

The position of the rotor is determined based on an output of a magnetic detecting element; however, it may alternatively be determined by a change in the induced voltage generated by the rotation of the rotor.

The microprocessor 17 controls the turning ON/OFF of the switching elements of the driving circuit 24 to provide the foregoing corresponding electric current supply patterns according to the detected rotational position of the rotor and it also adjusts the applied voltage so that the required voltage is applied to the fan motor 25 to provide a predetermined number of revolutions.

There are mainly an automatic operation mode and a manual operation mode for controlling the fan motor 25. In the automatic operation mode, the number of revolutions is automatically changed according to predetermined characteristics and according to the difference between room temperature and a preset temperature, i.e. a desired temperature. In the manual operation mode, the number of revolutions is fixed at a desired value.

Figure 3:
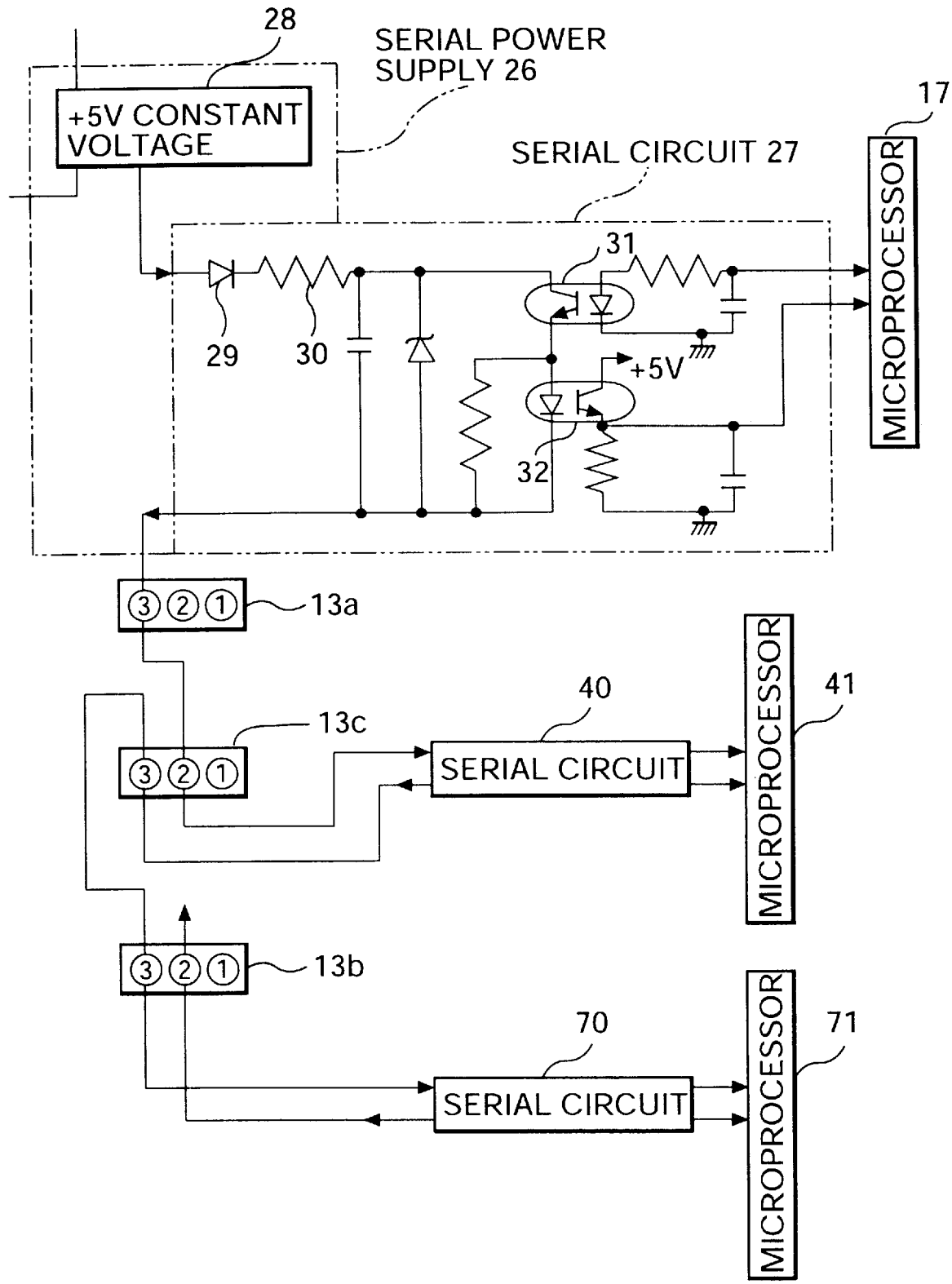
FIG. 3 is an electric circuit diagram illustrative of a relationship between a serial power supply, a serial circuit, and a microprocessor.

FIG. 3 is an electric circuit diagram illustrating the relationship among a serial power supply 26, a serial circuit 27, and the microprocessor 17; this diagram also shows the relationship between a serial circuit 40 and a microprocessor 41 of the heat source side unit 4 and a serial circuit 70 and a microprocessor 71 of the system-interconnection power supply 2 in terms of the connection of the connectors 13a through 13c.

The serial power supply 26 is equipped with a constant voltage circuit 28 which is connected to a 100-volt commercial AC power supply and which supplies a 5 VDC voltage. The constant voltage circuit 28 can be constituted using a general-purpose, constant voltage IC or the like.

The output of the constant voltage circuit 28 is connected to the terminal ③ of the connector 13a via a diode 29 connected in the forward direction, a resistor 30, a light receiving element of a signal issuing photocoupler 31, and a light emitting element of a signal receiving photocoupler 32 in series. The terminal ② of the connector 13b is one end of a power line; it is commonly used with the output of the grounded side of the constant voltage circuit 28 connected to the terminal ② of the connector 13a.

The serial circuit 27 has the same configuration as that of the serial circuit 70 of the system interconnection power supply 2 and the serial circuit 40 of the heat source side unit 4; therefore, these three serial circuits are connected in series to the constant voltage circuit 28.

The light emitting element of the signal output photocoupler 31 of the serial circuit 27 is turned ON/OFF in response to the outputs of the microprocessor 17; it is normally ON, that is, it is ON while it is standing by for receiving a signal. The light receiving element of the signal receiving photocoupler 32 converts the ON/OFF outputs to voltage changes through an output resistor and supplies them to the microprocessor 17; it is normally ON, that is, it is ON while it is not receiving any signals, and the outputs thereof to the microprocessor 17 are high level voltages (+5 V in this embodiment).

Hence, when supplying the signals to the microprocessor 17, the light emitting element of the photocoupler 31 is turned ON/OFF by using ON/OFF signals based on common protocol and data format. The ON/OFF signals are converted to the ON/OFF outputs of the constant voltage circuit 28 before they are sent to the respective microprocessors via the light receiving element of the signal receiving photocoupler, which turns ON/OFF, of the respective serial circuits 29, 40, and 70.

When receiving a signal, the ON/OFF output of the constant voltage circuit 28 obtained by the turning ON/OFF of the photocoupler of one of the serial circuits is received by the signal receiving photocouplers of all serial circuits which supply the signal to the respective microprocessors thereof. The signal has a set code for specifying the receiving microprocessor; therefore, the signal that has been received by the microprocessor specified by the code is regarded valid and the signal is employed for the control.

The serial circuit 27 is provided with a noise absorbing capacitor, a zener diode, and a resistor for protecting the photocouplers.

In FIG. 2, a receiving circuit 33 receives the signals from a wireless remote controller, which employs infrared signals or radio signals of radio waves, sound waves, or the like; such signals includes the ON/OFF signals of the air conditioner, the control signals of the amount of conditioned air to be blown by the fan motor 25, the control signals of the flap motors 18 and 19 for changing the blow direction, a signal for specifying a set temperature, a signal indicating a detected room temperature, a signal for validating a demand, and other types of signals which are sent by operating switches. The received signals are converted into predetermined serial codes and supplied to the microprocessor 17. When the supplied serial codes are valid, the microprocessor 17 carries out control in accordance with the signals of the valid series codes.

A group of display LEDs 34 is disposed near the light receiving section of the receiving circuit 33; it displays the operation state of the air conditioner including ON/OFF and timer operation mode.

Temperature sensors 35 and 36 detect the temperature of a heat exchanger constituting a refrigerating cycle for air conditioning and the ambient temperature of a room wherein the user side unit 3 is installed. Thermistors with negative characteristic or the like are used for the foregoing temperature sensors. The microprocessor 17 carries out the analog-to-digital conversion on the voltages corresponding to the resistance values which vary with the changes in such temperatures and uses the results for control.

A group of service display LEDs 37 restores and displays the record on a failure if the air conditioner has incurred a failure.

A group of switches 38 includes a switch for selecting among test mode, normal mode, and stop, and a switch for displaying the record of a failure.

Figure 4:
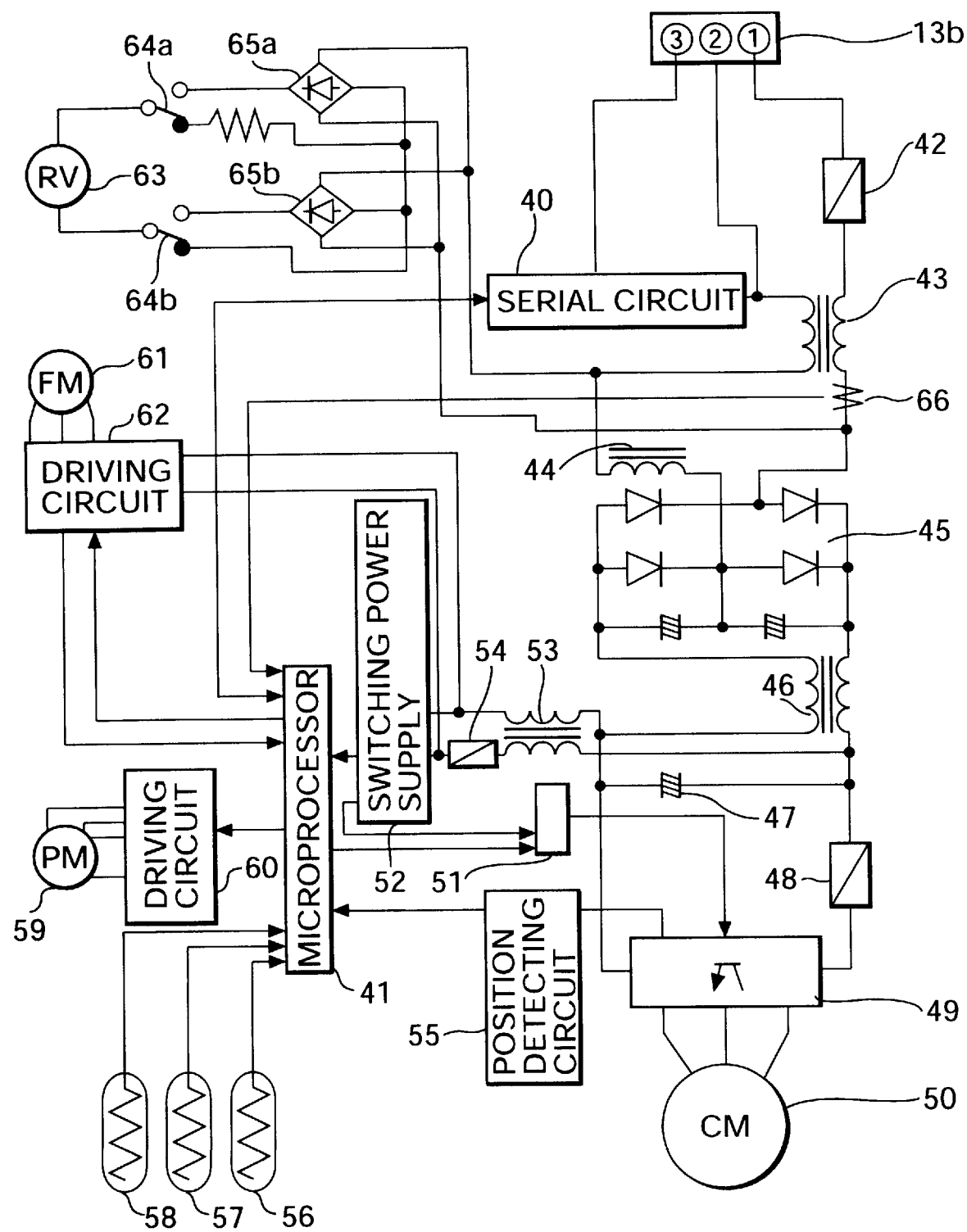
FIG. 4 is a diagram showing a control circuit of a heat source side unit of the air conditioner.

FIG. 4 is a diagram showing the control circuit of the heat source side unit 4; the single-phase 100 V AC power obtained through the terminal ① and the terminal ② of the connector 13b is converted to 280 V DC power via a current fuse 42, a noise filter 43, a choke coil 44, and a voltage doubler rectifying circuit 45 composed of four rectifying diodes and two smoothing capacitors. The DC power is supplied to a three-phase inverter bridge 49 constituted by six switching elements for power control such as power transistors and power FETs via a noise filter 46, a smoothing capacitor 47, and a current fuse 48.

A refrigerant compressor 50 constitutes a part of the refrigerating cycle for air conditioning. The compressor is equipped with, for example, a three-phase inductive motor or a three-phase DC brushless motor in the driving source thereof.

When the three-phase inductive motor is employed, the microprocessor 41 supplies three-phase, pseudo-sinusoidal waves to the compressor 50 which provides voltage/frequency values for each frequency which have been preset for ensuring high operating efficiency of the compressor 50. More specifically, such pseudo-sinusoidal waves are obtained by turning ON/OFF the six switching elements of the three-phase inverter bridge 49 according to the magnitudes of the modulated waves and carrier waves of desired frequencies; the switching elements are turned ON/OFF according to the theoretical calculation results given by the microprocessor 41. The frequency of the three-phase AC power supplied to the compressor 50 is determined by the frequency of the modulated wave.

A driving circuit 51 is a power amplifying circuit for turning ON/OFF the six switching elements of the three-phase inverter bridge 49 in response to the outputs of the microprocessor 41. A switching power supply 52 receives DC power via a noise filter 53 and a current fuse 54 and supplies the power for the driving circuit 51, the power for the microprocessor 41, and the constant-voltage power for other units. A general-purpose constant voltage IC or the like may be used for the driving circuit 51.

When a three-phase DC brushless motor is used as the driving source of the compressor 50 as in the case of the embodiment shown in FIG. 4, a position detecting circuit 55 detects the position of the rotor of the compressor 50, then the microprocessor 41 sets the combination of ON/OFF of the respective switching elements of the three-phase inverter circuit 49 so as to provide an electric current supply pattern which is suited to the rotational position of the rotor.

The position detecting circuit 55 applies to the microprocessor 41 an output which changes according as whether the change in the induced voltage generated in the winding of a stator as the rotor rotates is greater or smaller than the voltage corresponding to the voltage at the neutral point of the three-phase alternating currents. The microprocessor 41 calculates the rotational position of the rotor of the compressor 50 according to the time when the output of the position detecting circuit 55 has changed.

The microprocessor 41 then determines in which of six sections the rotor is positioned, the six sections having been provided by equally dividing one rotation, i.e. 360 degrees, into six sections at every 60 degrees, and it turns ON/OFF the switching elements of the three-phase inverter circuit 49 so that the three-phase electric current supplying pattern (e.g. a three-phase AC supply pattern wherein each phase repeatedly turns ON for 120 degrees and OFF for 60 degrees) which corresponds to that particular section is set for the compressor 50.

The number of revolutions of the compressor 50 is changed by chopping at a predetermined cycle rather than by continuous 120-degree electric current supply and also by changing the ON duty of the chopping to change the voltage substantially applied to the winding of the stator.

Temperature sensors 56, 57, and 58 are composed of thermistors having negative characteristic; they are configured such that the voltage corresponding to the resistance value that changes with temperature is supplied to an analog-to-digital input port of the microprocessor 41. The temperature sensor 56 detects the temperature of open air; the temperature sensor 57 detects the temperature of the compressor 50; and the temperature sensor 58 detects the temperature of the heat source side heat exchanger which is a constituent part of the refrigerating cycle. The microprocessor 41 employs the temperature data received from these temperature sensors to conduct control.

A stepping motor 59 has approximately 500 steps of rotation to allow a stroke in 500 steps; the stroke regulates the pressure reducing amount or the expansion of an expansion device or an expansion valve which is a constituent part of the refrigerating cycle. The rotation step of the stepping motor 59 is controlled according to the output given by the microprocessor 41 via the driving circuit 60. There are mainly two control methods: in one control method, the rotation step is controlled by the characteristics which have been established beforehand to be associated to the number of revolutions of the compressor; in the other control method, the number of rotation steps is increased or decreased so as to always maintain a constant evaporating temperature or condensing temperature of the refrigerant in the refrigerating cycle.

A fan motor 61 drives a propeller fan provided in a position for blowing wind to the heat source side exchanger. The fan motor 61 employs a DC brushless motor as is the case with the fan motor 25; the number of revolutions thereof is also controlled by the microprocessor 41 via a driving circuit 62.

A refrigerant channel selector valve 63 switches the flow of the refrigerant to allow switching between a cooling mode wherein the user side heat exchanger in the refrigerating cycle acts as an evaporator and a heating mode wherein the user side heat exchanger acts as a condenser. A four-way valve is usually used for the refrigerator channel selector valve 63.

Connection is switched between selector armatures 64a and 64b via a power relay according to an output of the microprocessor 41. FIG. 4 shows a state where no electric current is being supplied to the power relay.

When the connection of the selector armature 64a is switched to a diode bridge 65a, electric currents flow from the selector armature 64a to the armature 64b, causing the refrigerant channel selector valve 63 to be switched to one side. Conversely, when the connection of the selector armature 64b is switched to a diode bridge 65b, electric currents flow from the selector armature 64b to the selector armature 64a, causing the refrigerant channel selector valve 63 to be switched to the other side. The refrigerant channel selector valve 63 has a self-holding mechanism which maintains a switched state; therefore, the refrigerant channel can be switched by supplying electric currents in a predetermined direction for a predetermined time. Electric currents are applied at predetermined intervals to maintain the self-holding of the channel.

A current transformer 66 is installed in a position where it can measure the currents consumed by the heat source side unit 4. The instantaneous values of the current waveform output from the current transformer are directly subjected to analog-to-digital conversion at predetermined intervals and the results are captured by the microprocessor 41. The microprocessor 41 calculates root mean square values from a current waveform based on the enumeration of digitalized values at predetermined intervals and it uses the obtained root mean square values for controlling the currents.

The control of currents is conducted to control the number of revolutions of the compressor 50, i.e. the refrigerating capability of the air conditioner, so that the currents consumed by the heat source side unit stay under a preset value of current. The number of revolutions of the compressor 50 is decided based on the increase or decrease of refrigerating capability relative to the current refrigerating capability which is determined by fuzzy operation tuned so that room temperature reaches a preset temperature in the user side unit 2, using the difference between the room temperature and the present temperature and the change in the difference as the inputs. The increased or decreased value is sent from the user side unit 2 via the serial circuit 40.

The number of revolutions of the compressor 50 is set by adding the increased or decreased value to the current number of revolutions and it is updated to a new number of revolutions. The microprocessor 41 turns ON/OFF the switching elements of the three-phase inverter circuit 49 such that the compressor 50 reaches the updated number of revolutions. At the time of startup, the compressor 50 has been set to a predetermined number of revolutions as the initial value thereof.

As the power consumed approaches a preset value, a correction is made in different ranges in order, namely, a range wherein no correction is made, a range wherein a correction is made to prevent the number of revolutions from increasing, and a range wherein a correction is made to decrease the number of revolutions, thus preventing the consumed currents of the compressor 50, i.e. the consumed currents of the heat source side unit, from exceeding a preset value. If the consumed currents considerably exceed the preset value, then it is regarded as a failure of the air conditioner AC and the operation of the air conditioner is stopped and the failure is displayed.

Hence, the consumed currents of the air conditioner AC can be approximately controlled by changing the preset value. The preset value is set by a signal issued from the user side unit; it is set, for example, to 20 A, 17 A, 15 A, or 10 A for a general household air conditioner.

The preset value can be also changed on a 1-ampere basis by using an increase or decrease signal received from the system interconnection power supply 2, which will be discussed later, while the demanding function is being enabled after a signal from the remote controller has been sent via the user side unit 3.

Figure 5:
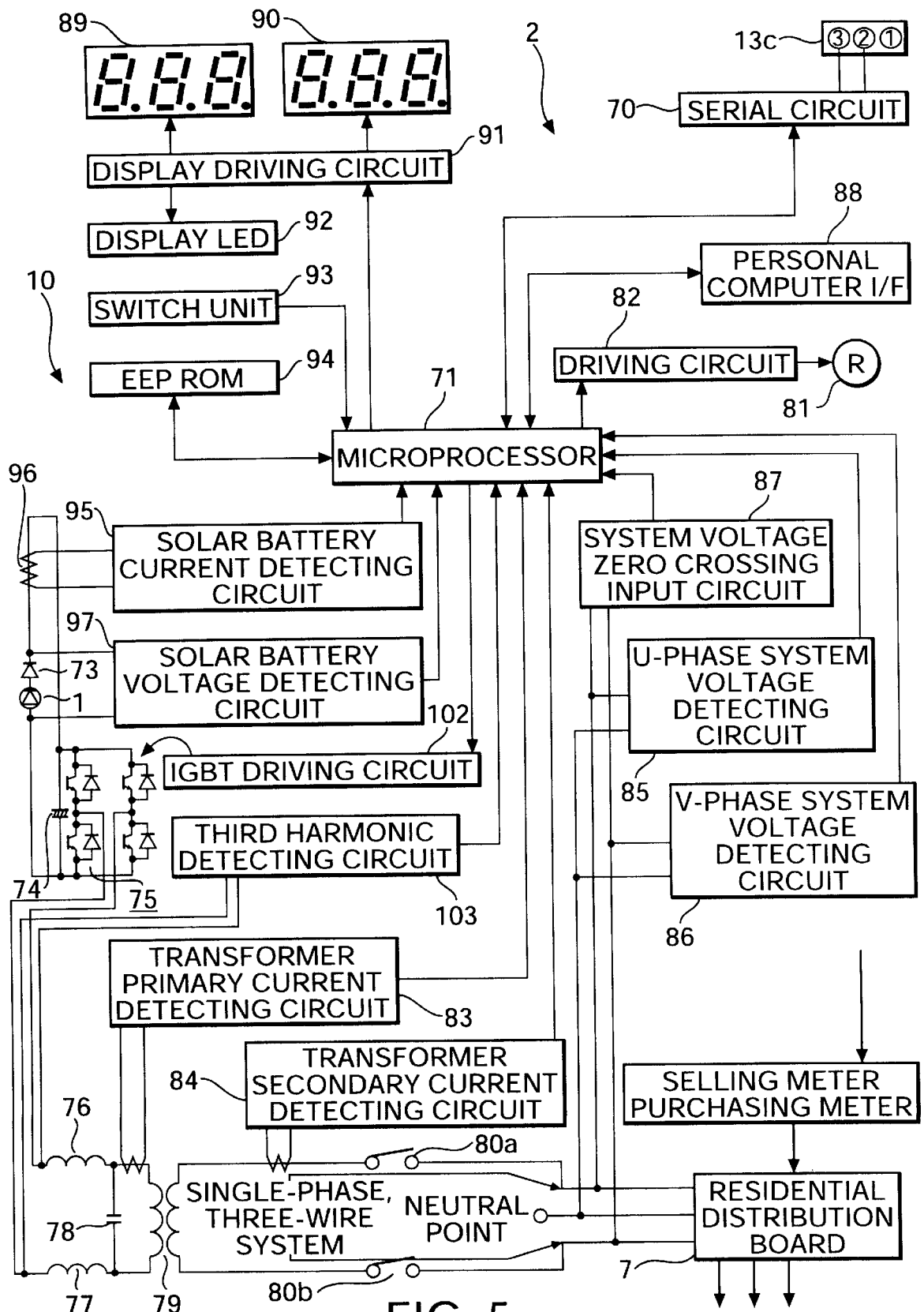
FIG. 5 is a diagram showing a control circuit of the system-interconnected generator.

FIG. 5 shows the control circuit of the system-interconnected generator 10 composed of the solar battery 1 and the system interconnection power supply 2; it is configured to permit the exchange of signals among the microprocessor 71, the microprocessor 17, and the microprocessor 41 via the serial circuit 70. In this circuit, the foregoing solar battery 1 for converting solar energy to electric power is connected to a capacitor 74 via a protecting diode 73, and the power generation output is stored in the capacitor 74.

In a single-phase inverter circuit 75, four switching elements composed of IGBT or other type of power switching elements are connected in bridge; the respective switching elements are turned ON/OFF according to predetermined patterns to provide a 50 Hz or 60 Hz single-phase, 100 V pseudo sinusoidal wave. The pseudo sinusoidal wave passes through coils 76, 77 and a low-pass filter constituted by a capacitor 78 and it is boosted to AC power of 50 Hz, single-phase 200 V+α (α denotes a voltage required to reach the system). The AC power is supplied to the power line of the system via the residential distribution board 7 shown in FIG. 1.

Interlocked, normally open armatures 80a and 80b are closed when electric currents are supplied to a power relay 81. The power relay 81 is energized or de-energized by the microprocessor 71 (U83C196MH made by INTEL) via a driving circuit 82 which is a power amplifying circuit. If the microprocessor 71 determines that the solar battery 1 is not generating power or if any failure has been detected, then it opens the normally open armatures 80a and 80b to isolate the system interconnection power supply 2 from the system.

A transformer primary current detecting circuit 83 detects the currents flowing through the primary of a boosting transformer 79, i.e. the solar battery 1. The current is output in the form of an alternating current waveform through C.T. and directly supplied to the analog-to-digital conversion port of the microprocessor 71. The microprocessor 71 subjects the waveform to analog-to-digital conversion at every predetermined intervals (e.g. every 200 μsec) and employs the result for control, taking it as an instantaneous current value at every predetermined time interval.

To implement the control, the microprocessor 71 first stores the current value, which has gone through the analog-to-digital conversion, in a storage section (ROM) as table data and compares it with the current value at the same phase of ideal current waveform data, which is a sinusoidal current waveform, makes a correction to increase or decrease the voltage of the same phase in the following cycle so that the waveform of the output current is close to the ideal current waveform, thereby restraining the distortion of the waveform of the output current.

For electric currents of 50 Hz, sampling is performed at every 200 μsec to produce the ideal current waveform table data; therefore, 20 msec/200 μsec=100 pieces of data, or 84 pieces of data for 60 Hz.

The ideal waveform data can be calculated by multiplying reference data by a predetermined ratio for each required current root mean square value according to pre-established reference data.

A transformer secondary current detecting circuit 84 detects the currents flowing through the secondary of the boosting transformer 79, i.e. the system side. This circuit supplies the waveform of the current detected through C.T. to an IC for calculating root mean square values (e.g. NJM4200 made by Shin Nippon Musen K. K.) via a full-wave rectifying circuit which employs a general-purpose IC (e.g. LA6324 made by Sanyo Denki K. K.). The IC converts the root mean square value of the current detected through the C.T. to a voltage change and supplies the voltage change to the analog-to-digital input port of the microprocessor 71. The microprocessor 71 determines the current root mean square value from the voltage change so as to determine the output power value of the system interconnection power supply 2 and displays it on the display unit.

A U-phase system voltage detecting circuit 85 and a V-phase system voltage detecting circuit 86 cut off the supply of power to the system if a fluctuation exceeding a predetermined value has taken place in the voltage which is applied to the system. These circuits respectively detect the voltage between the neutral point and the U-phase and the voltage between the neutral point and the V-phase from the single-phase, three-wire, 200 V AC power supplied by the system-interconnected generator 10. These detecting circuits are identical and they commonly use the electric circuit shown in FIG. 6.

Figure 6:
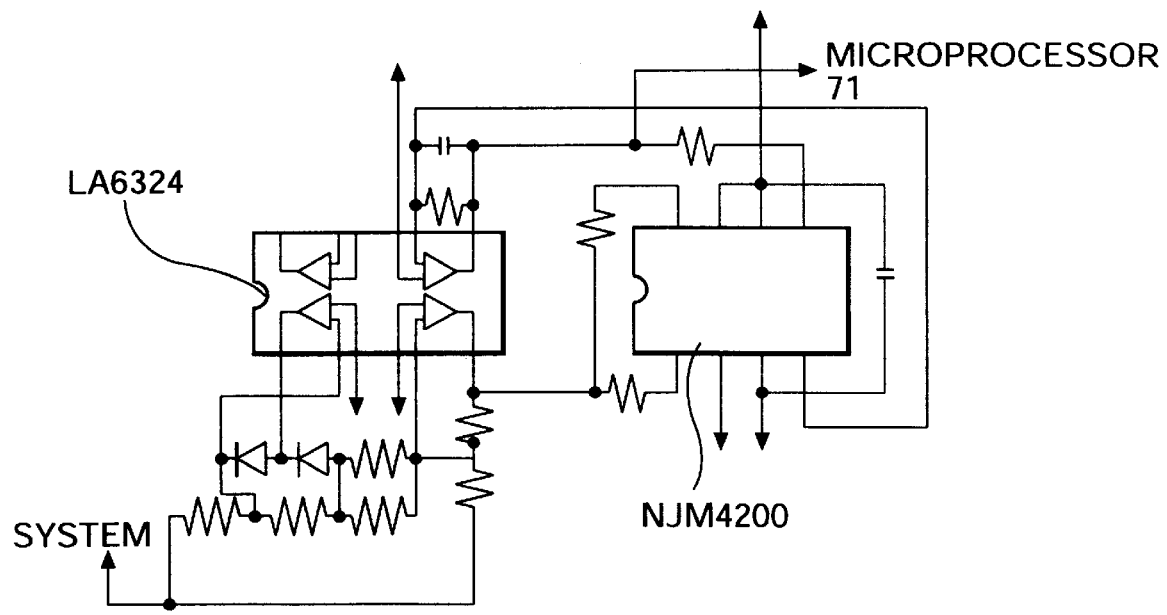
FIG. 6 is an electric circuit diagram showing a U-phase system voltage detecting circuit and a V-phase system voltage detecting circuit.

In FIG. 6, the change in the voltage between the terminals received from the system side is supplied via the LA6324, which is the IC constituting the full-wave rectifying circuit, to the NJM4200, which is the IC for calculating the root mean square value, and the DC voltage corresponding to the root mean square value is supplied to the analog-to-digital conversion input port of the microprocessor 71. The microprocessor 71 uses the root mean square value of the voltage, which has undergone the analog-to-digital conversion, to carry out the control.

A system voltage zero crossing input circuit 87 judges a zero crossing signal of the system (AC power) and supplies the signal to the microprocessor 71.

Figure 7:
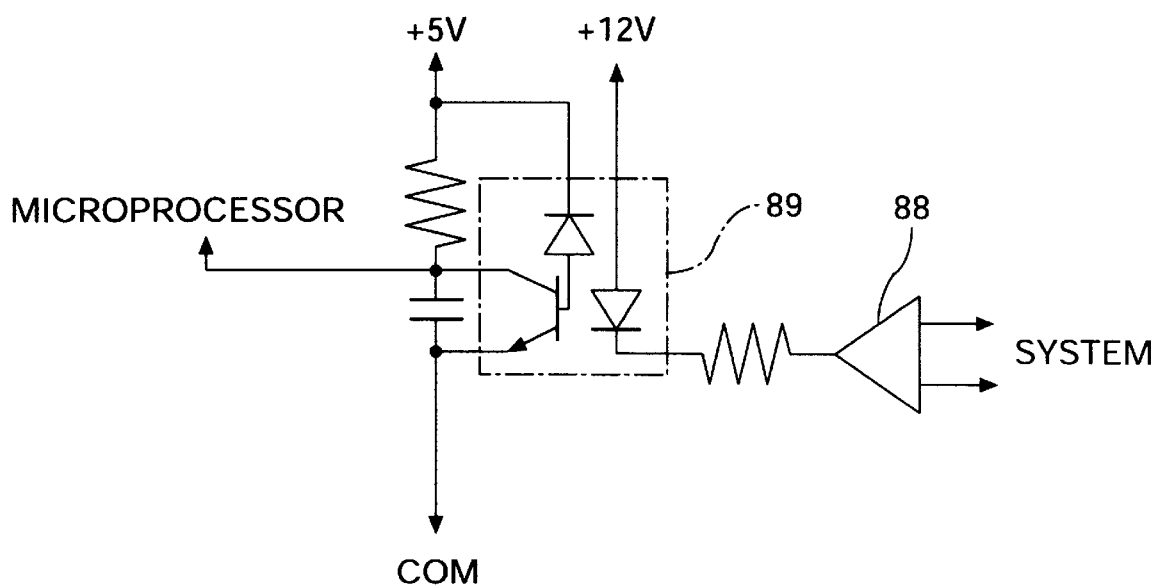
FIG. 7 is an electric circuit diagram showing a system voltage zero crossing input circuit.

FIG. 7 shows the system voltage zero crossing input circuit 87; the voltage of the system is supplied to a comparator 88. When the positive and negative of the voltage applied to the input terminal of the comparator 88 is reversed, the output thereof is also reversed. The output of the comparator 88 is applied to a photocoupler 89 and it undergoes noise removal, voltage conversion, and electrical isolation before it is supplied to the microprocessor 71. The microprocessor 71 determines the zero crossing point of the system from the change in the output and controls the output timings of the ON/OFF signals for the switching elements so that the zero crossing pattern of the AC power output from the single-phase inverter circuit 75 matches the zero crossing pattern of the system, the zero crossing point providing the reference timing for matching phases when making a voltage correction for obtaining the foregoing ideal current waveform.

A personal computer interface (I/F) 88 provides an interface circuit for the connection of a signal conductor when connecting to a personal computer outside. This circuit permits the communication of a predetermined standard (e.g. RS-232C); it employs a general-purpose IC which enables the RS-232C type communication such as MAX232. Using the personal computer I/F 88 makes it possible to control the system-interconnected generator 10 from outside through the personal computer.

Displays 89 and 90 are composed of three digits, each digit having eight segments; they mainly display the power generated by solar battery 1, the codes indicating the type of failures if failures have occurred, and the guideline set values for initialization. The output signals from the microprocessor 71 are power-amplified by a display driving circuit 91 composed of a general-purpose driver IC and they are applied to the displays 89 and 90 which are dynamically lighted in response to the signals.

A display LED 92 is dynamically lighted via the display driving circuit 91 in response to an output signal of the microprocessor 71. The display LED 92 is lighted green to indicate that the system-interconnected generator 10 is in operation, or to indicate the open or closed states of the normally open armatures 80a, 80b which open in case of a failure; it is lighted red if a failure occurs, or it is lighted yellow if the solar battery 1 is generating insufficient power.

A switch unit 93 is composed of pushbutton switches or lock type pushbutton switches connected in matrix relative to the I/O port of the microprocessor 71. The states of these switches are captured by the microprocessor 71 through key scanning of the microprocessor 71 and used for the control.

The switches primarily include those for validating the changing mode of set values, those for erasing stored data indicative of the records of failures, and those for starting and stopping the system-interconnected generator 10.

An EEPROM 94 is a memory for storing set values and the brief histories of failures, the set values being used for individually setting reference values for judging failures which differ from one system to another.

A solar battery current detecting circuit 95 detects the amount of currents output from the solar battery 1 and supplies the detection result to the microprocessor 71.

Figure 8:
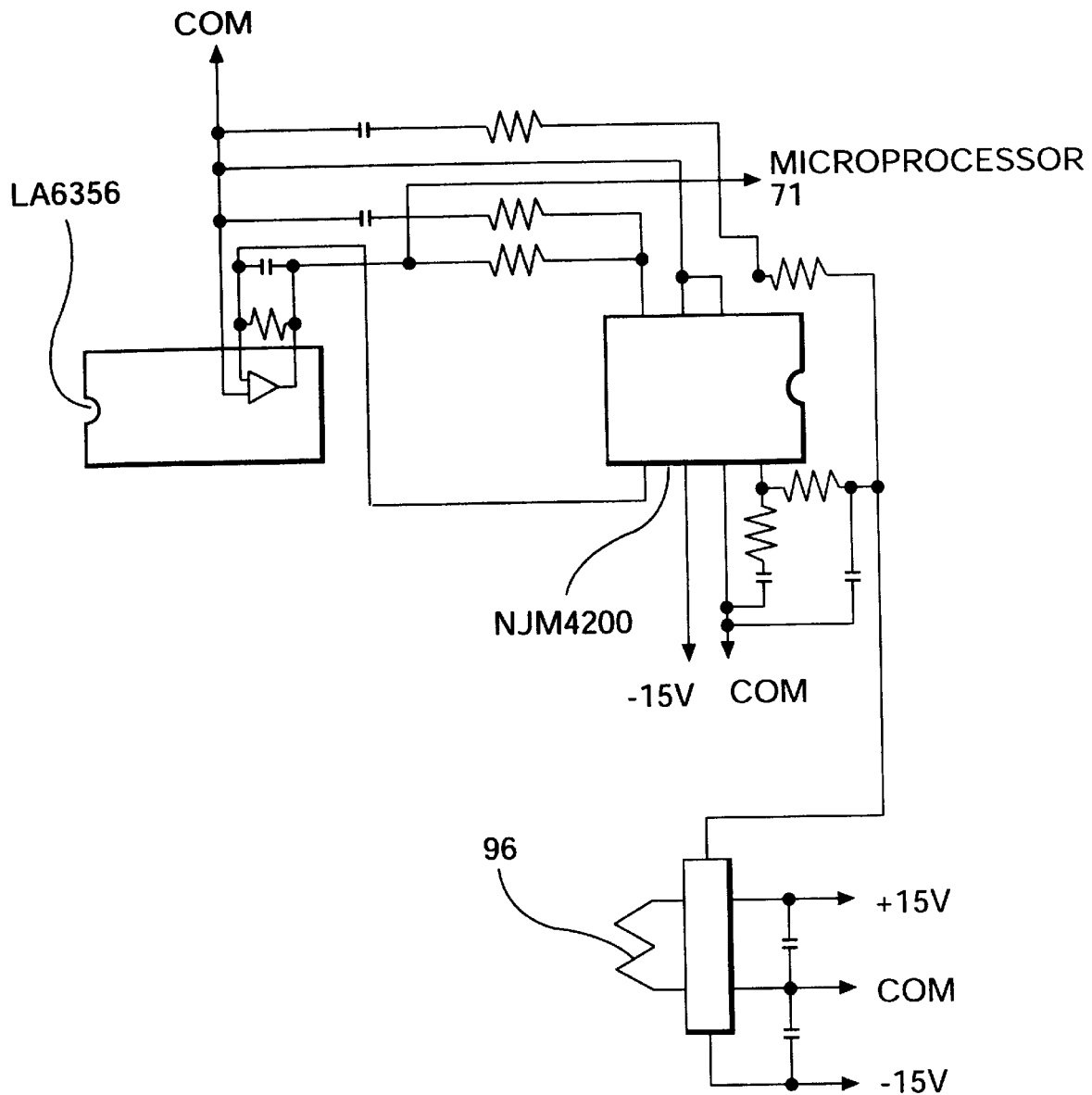
FIG. 8 is an electric circuit diagram showing a solar battery current detecting circuit.

FIG. 8 is an electric circuit diagram showing a solar battery current detecting circuit 95; a DC current detecting transformer 96 outputs a voltage corresponding to the currents output from the solar battery 1. The output is supplied to the IC, NJM4200, for calculating a root mean square value to provide the voltage corresponding to the root mean square value of the currents. The currents output from the solar battery 1 are not completely direct currents and they contain pulsating flow components; therefore, the root mean square value is calculated to obtain an accurate current value. The microprocessor 71 captures the voltage through the analog-to-digital input port and stores the current value corresponding to the voltage at a predetermined address in a memory to use it for the control.

Figure 9:
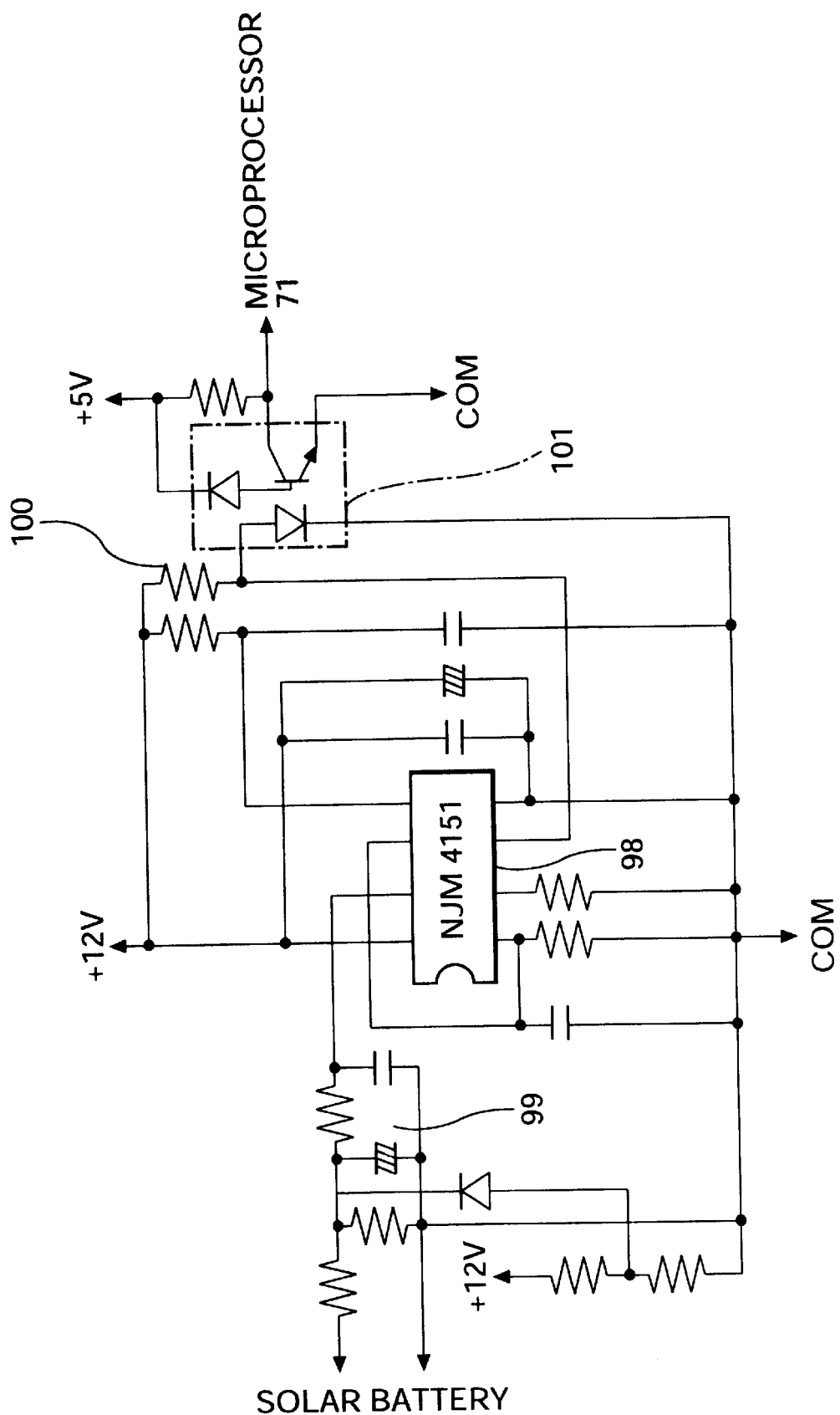
FIG. 9 is an electric circuit diagram showing a solar battery voltage detecting circuit.

A solar battery voltage detecting circuit 97 detects the voltage between the terminals of the solar battery 1 and transfers the detected voltage to the microprocessor 71. FIG. 9 shows the electric circuit of the solar battery voltage detecting circuit; reference character 98 denotes a voltage-to-frequency (V/F) converting IC (e.g. NJM4151 made by Shin Nippon Musen K. K.).

The voltage between the terminals of the solar battery 1 is divided through a resistor and raised by a predetermined amount before it is stabilized through a capacitor 99 and applied to the voltage input terminal of the V/F converting IC 98 which provides an output at a frequency corresponding to the applied voltage and supplies the output to the light emitting element of a photocoupler 101 by using an output resistor 100. The output of the photocoupler 101 is given to the microprocessor 71 which measures the frequency of the received output to determine a corresponding voltage.

An IGBT driving circuit 102 drives the switching elements constructing the single-phase inverter 75. In this embodiment, the IGBT driving circuit is employed; however, if a power transistor or a power FET is used, then a transistor driving circuit or an FET driving circuit will be employed.

More specifically, the IGBT driving circuit 102 amplifies the power of the ON/OFF signals issued from the microprocessor 71 to a level which is sufficiently high to drive the IGBT; it is constituted by a photocoupler, amplifier circuit, etc. A general-purpose driving circuit may be used for the purpose.

A third harmonic detecting circuit 103 detects such failures as a power failure and disconnection of a system by detecting an increase in the third harmonic and cuts off the connection thereof to the system-interconnected generator 10. The third harmonic detecting circuit 103 is composed of a band-pass filter, a V/F converting circuit, etc. (Refer to Japanese Patent Application No. 7146599.)

The system-interconnected generator 10 thus constructed converts the power generation output of the solar battery 1 to a 100 V single-phase AC power based on 50 Hz or 60 Hz pseudo sinusoidal waves through the single-phase inverter circuit 75 if the voltage detected by the solar battery voltage detecting circuit 97 is a predetermined voltage or higher, that is, if it is the value, at which generated power can be taken out, or higher.

The single-phase AC power is converted to a 200 V single-phase AC power through the boosting transformer 79 and it is supplied to the system if the normally open armatures 80*a* and 80*b* are closed. In actual operation, the power is set such that it is slightly higher than 200 V in order to allow the power to reach the system; however, it is assumed in the following description that the power is 200 V.

At this time, the power generated by the solar battery 1 is dynamically displayed on the display 89 by the microprocessor 71.

Figure 10:
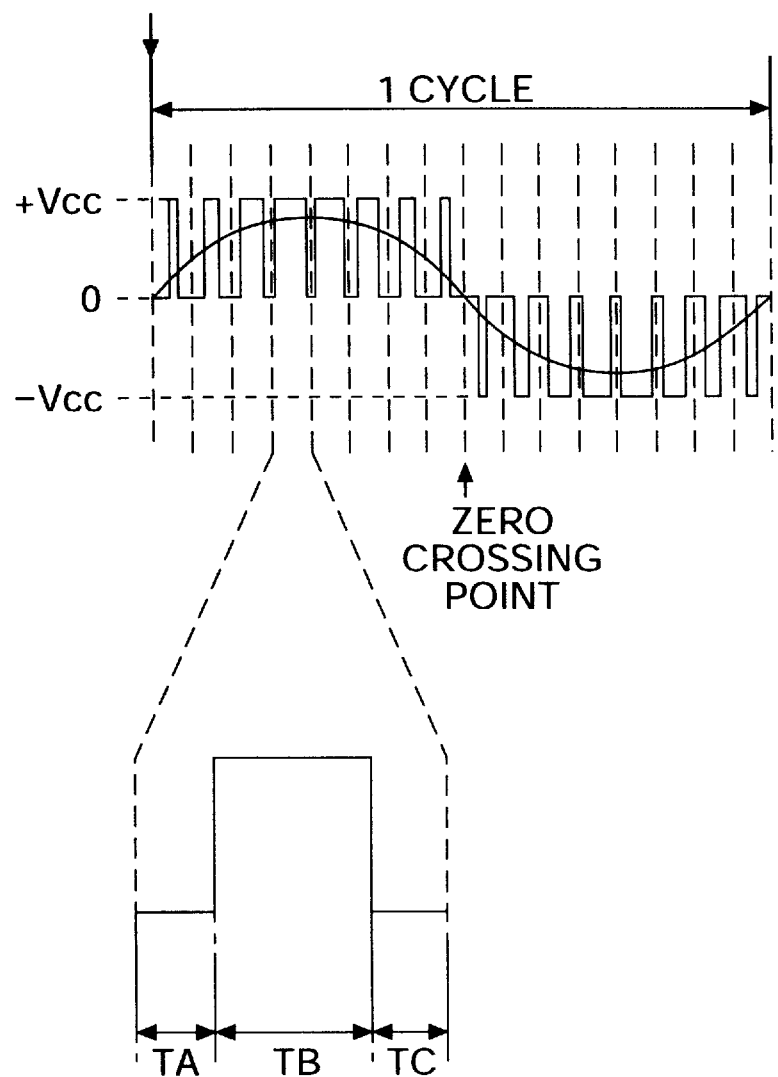
FIG. 10 is an explanatory diagram illustrative of a pseudo-sinusoidal wave output from a single-phase inverter circuit.

FIG. 10 is an explanatory view indicative of a pseudo sinusoidal wave (the sinusoidal wave indicates the current waveform) generated by the single-phase inverter circuit 75. For easier understanding, one cycle is divided into sixteen sections, namely, section 1 through section 16. In practical use, for 50 Hz, one cycle is 20 msec and the sampling is performed at intervals of 200 $\mu$sec; therefore, there will be 100 sections (20 msec divided by 200 $\mu$sec). For 60 Hz, there will be 84 sections.

One cycle begins in synchronization with a zero crossing signal issued from the system voltage zero crossing input circuit 87. From the point where the zero crossing signal has been received, the waveform divided into the sixteen sections is output, the sixteen sections being output in order. Reference character Vcc denotes the voltage between the terminals of the smoothing capacitor 74.

The zero crossing signal is issued twice at every 180 degrees in a cycle, so that eight sections (section 1 to section 8) constituting half a cycle may be defined as one cycle. In this case, the next half of the cycle is the output of the eight sections (section 1 to section 8) which have been reversed.

The three potential points, namely, +Vcc, 0, and −Vcc, are obtained by selecting proper combinations of the ON/OFF states of the switching elements of the single-phase inverter circuit 75. Thus, the pseudo sinusoidal wave can be obtained by changing in order the combinations of the ON/OFF states.

Each one of the sixteen sections (see, for example, the fourth section from the zero crossing point) consists of three periods, namely, TA, TB, and TC; the period TA and the period TC have the same length of time.

Hence, a data table which shows frequency F (50 Hz/60 Hz) and the value or time of TB for each section from 1 through 16 is stored in the storage section. A selected combination of ON/OFF is implemented and maintained for the set value or time for each section. The value of TA and TC is (200 $\mu$sec−TB)/2.

Figure 11:
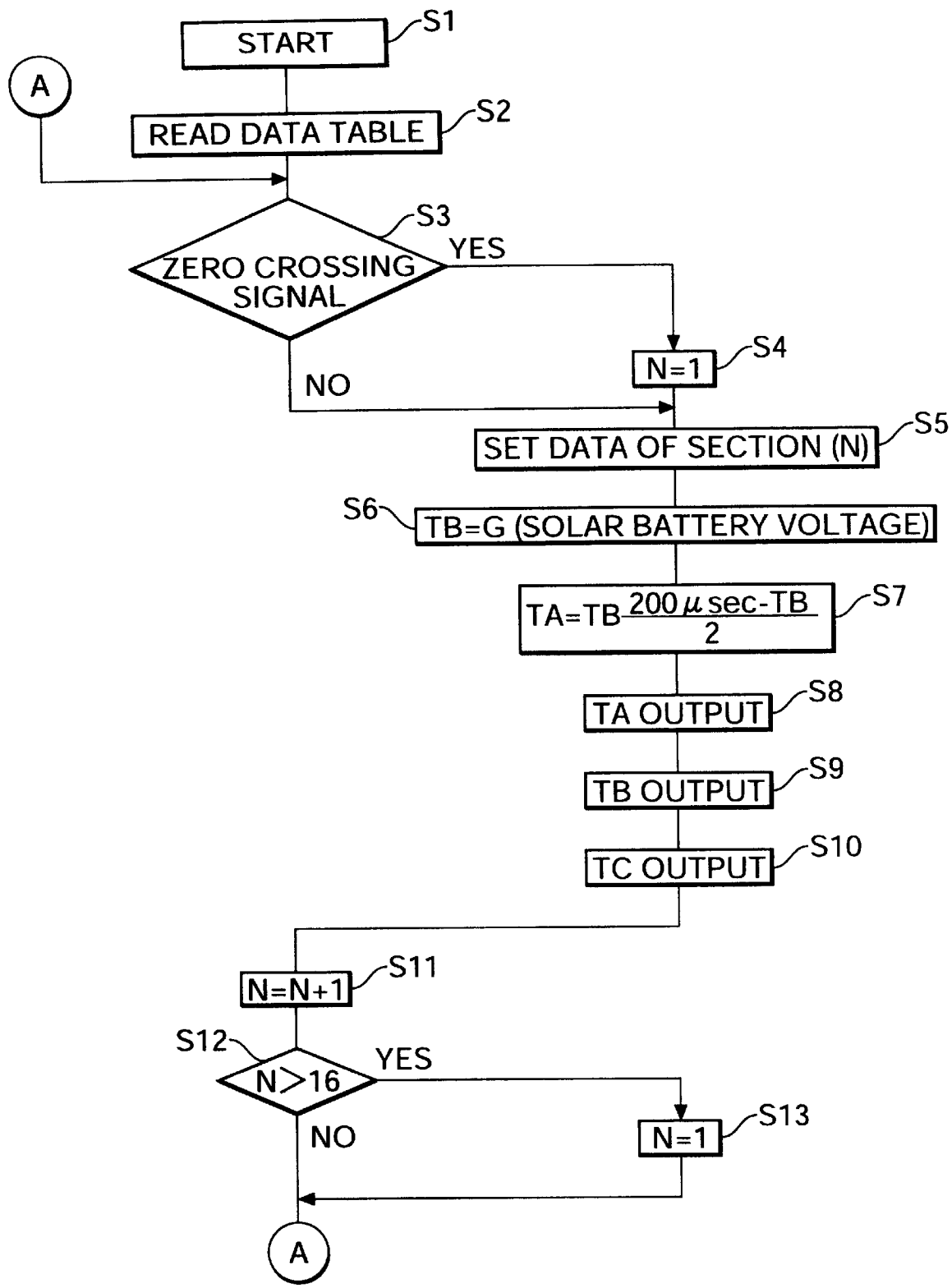
FIG. 11 is a flowchart illustrative of a procedure for generating the waveform of the pseudo-sinusoidal wave.

FIG. 11 shows a flowchart for generating the waveform of the pseudo sinusoidal wave. In the flowchart, various initializations are performed in a step S1, the n the microprocessor 71 begins operation. In a step S2, the required data for the frequency is read from the data table stored in the ROM 94 to generate a new data table.

In a step S3, the microprocessor judges whether there has been an output from the system voltage zero crossing input circuit 87; if the microprocessor decides that the zero crossing signal has been received, then it sets "N=1" in a step S4 and proceeds to a step S5. If no zero crossing signal is found in the step S3, the microprocessor immediately proceeds to the step S5. The judgment of the zero crossing signal is implemented by the interrupt by the microprocessor 71; therefore, the step S3 is implemented whenever the zero crossing signal is issued.

In the step S5, the data on TB of the section specified by a variable N is read from the new table. In the following step S6, the data on TB is corrected according to a pre-established format in relation to the voltage of the power generated by the solar battery so as to obtain the current value of the pseudo sinusoidal wave which has been set to enable the solar battery to generate power at an optimum operating point.

In a step S7, the value for TA and TC is calculated from the corrected value of TB; a predetermined combination of the ON/OFF signals is implemented and held for the calculated value or time in the subsequent steps S8, S9, and S10. This generates the waveform for one section as shown in FIG. 10.

In the steps S8 through S10, to count the time for holding the predetermined combination of the ON/OFF signals, a timer is used which allows an interrupt signal to be issued when time is up, thus enabling the microprocessor 71 to conduct other type of control until the time is up, that is, until the interrupt signal is issued.

Next, the microprocessor sets "N=N+1" in a step S11 and goes onto the following section; if it judges in a step S12 that N is greater 16, then it moves the section, where N equals 1, back to the beginning.

The microprocessor then goes back to the step S3 to generate a continuous pseudo sinusoidal wave.

Figure 12:
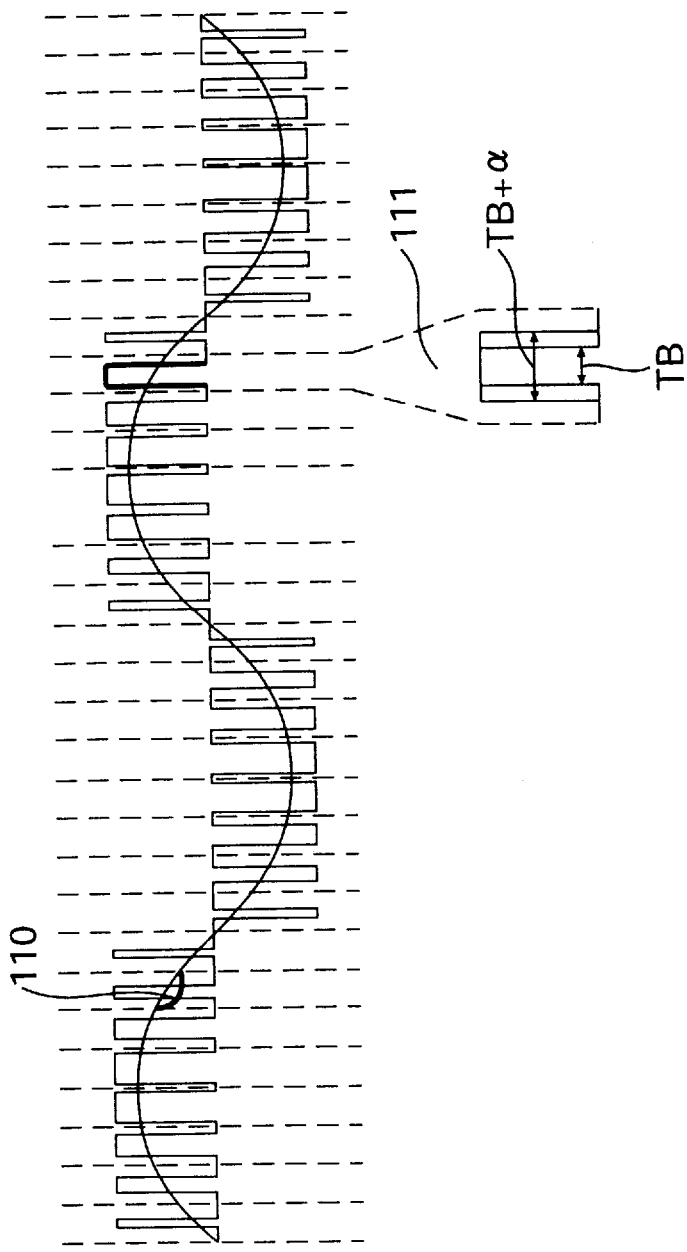
FIG. 12 is an explanatory diagram illustrative of a waveform of two cycles of the pseudo-sinusoidal wave.

FIG. 12 shows two cycles of the pseudo sinusoidal wave generated as described above. In FIG. 12, a distortion 110 of the current waveform is caused by the induced load developed by an electric component with respect to a theoretical pseudo sinusoidal wave. The distortion is judged by comparing the instantaneous value of currents obtained via the transformer primary current detecting circuit 83 with a theoretical current value.

The distortion is corrected in the following cycle by correcting the value of TB constituting the same section denoted by reference character 111 in the following cycle. More specifically, the distortion 110 of the actually measured current waveform is smaller than the theoretical current value; therefore, the value of TB is corrected to "TB=TB+$\alpha$" (where $\alpha$ is a positive value) in the section 111. If the distortion 110 of the actually measured current waveform is larger than the theoretical current value, then a negative value is adopted for $\alpha$. This correction is carried out on all sections wherein the actually measured current value is different from the theoretical value; for each cycle, the value of the next cycle is corrected in sequence.

The foregoing correction can be repeated by updating the corrected TB value by using the value of data read from the data table in the step S2 of the flowchart shown in FIG. 11.

Figure 13:
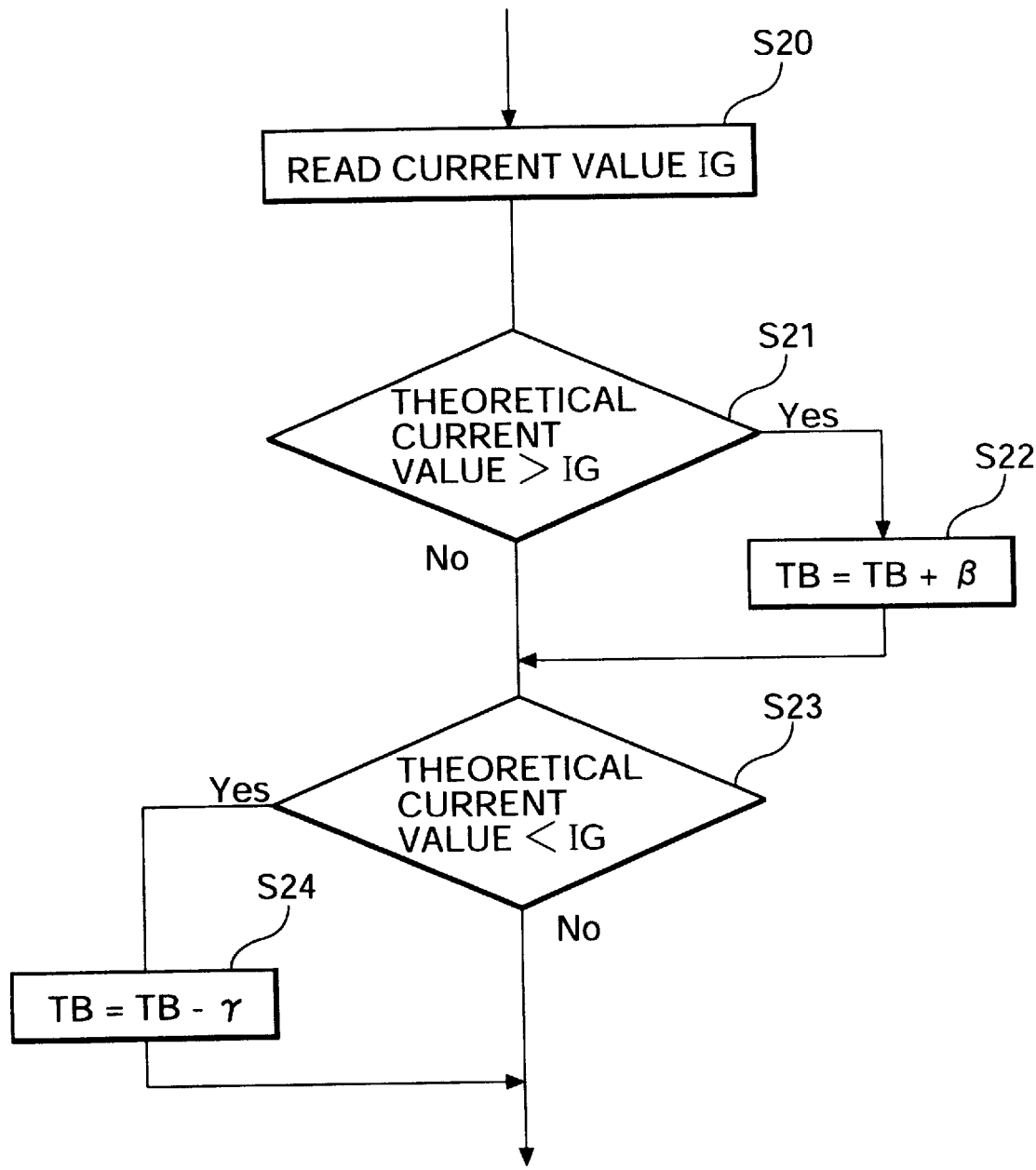
FIG. 13 is a flowchart illustrative of a procedure for correcting a current waveform.

FIG. 13 gives a flowchart showing the operation which is performed concurrently while the processing in the steps S8, S9, and S10 of the flowchart shown in FIG. 11 is being carried out. This operation may be performed at the time of switching of sections if processing speed of the microprocessor 71 is fast enough to do that.

In a step S20, a current IG detected by the transformer primary current detecting circuit 83 is read. The current may be the current of a section which has already been read.

In steps S21 and S23, the microprocessor compares the foregoing current value IG with the theoretical current value of the pseudo sinusoidal wave which has been set to allow the solar battery 1 to generate power at the optimum operating point; if the value of IG is smaller than the theoretical current value, then the microprocessor corrects the value of TB of the data table of the corresponding section to "TB=TB+$\beta$" and updates the value of IG in a step S22. If the value of IG is greater than the theoretical current value, then the microprocessor corrects the value of TB of the data table of the corresponding section to "TB=TB-$\gamma$" and updates it in a step S24. The values of $\beta$ and $\gamma$ are appropriately set according to the maximum output of the solar battery 1; $\beta$ may be equal to $\gamma$. The values of $\beta$ and $\gamma$ are such that they allow the current value IG to reach the theoretical current after a few corrections are made to decrease the variation of currents.

Making such corrections on each section of the pseudo sinusoidal wave permits the solar battery 1 to generate power under an optimum condition at all times and also to nearly remove distortions from the current waveform of the pseudo sinusoidal wave, thus making it possible to supply AC power of a stable waveform to a system.

In the foregoing embodiment, the value of the data table was firstly corrected according to the distortion in the current waveform, then the corrections were made to enable the solar battery to operate under an optimum condition. Alternatively, however, the corrections may be made first to enable the solar battery to operate under an optimum condition, then the distortion of the current waveform may be corrected. In this case, a data table for correcting the distortions in current waveforms is provided separately, this table is updated for every cycle, and the corrected value is added after the correction for ensuring the optimum operation of the solar battery has been made.

Further, the microprocessor 71 determines the power generated by the solar battery 1 from the current value detected by the solar battery current detecting circuit 95 and the voltage value detected by the solar battery voltage detecting circuit 97, and it issues a demand signal for controlling the operation of a load from the integrated generated power and the power consumed by the load.

Firstly, the integrated value of the power generated by the solar battery 1 is stored in the storage section. Then, the value of power consumed by the heat source side unit 4 of the air conditioner AC, a load, is obtained via the serial circuit 70. The value of the consumed power is an integrated current value employed by the heat source side unit 4 to control the currents; it approximately corresponds to the power consumed by the load, namely, the air conditioner.

In the next step, the demand signal is sent to the heat source side unit 4 via the serial circuit 70 to regulate the operating capability of the air conditioner AC; the demand signal is based on the value of the integrated power obtained by subtracting the value of the consumed power from the value of the foregoing integrated power. When sufficient integrated power has been restored, the demand signal is cleared.

Figure 14:
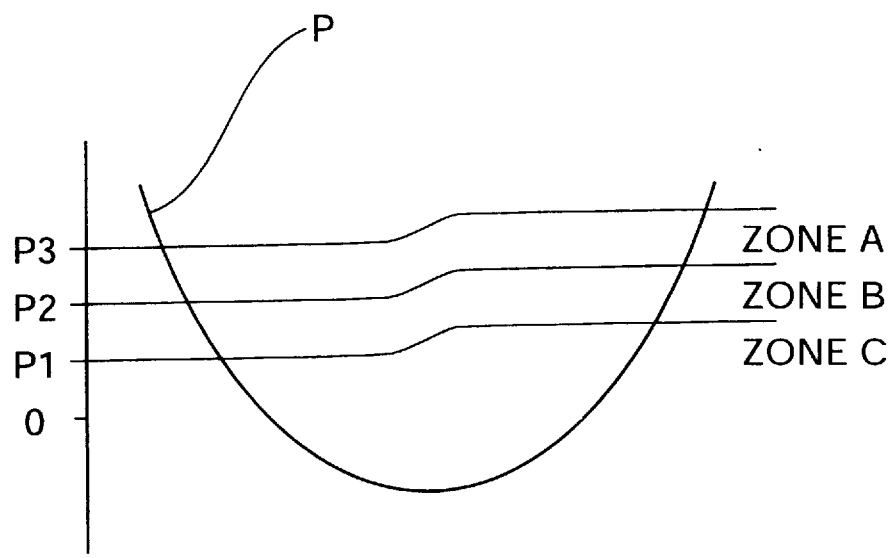
FIG. 14 is an explanatory diagram illustrative of a relationship between demand and the changing integrated value of the power generated by the solar battery.

FIG. 14 illustrates the relationship between demand and the changing integrated value of the power generated by the solar battery. Reference character P in the chart of FIG. 14 denotes the integrated value of the power generated by the solar battery 1; P3 denotes a value corresponding to the power consumed by the load, namely, the air conditioner AC, over a period of three days; P2 denotes a value corresponding to the power consumed by the load, namely, the air conditioner AC, over a period of two days; and P1 denotes a value corresponding to the power consumed by the load, namely, the air conditioner AC, over a period of one day. These values are appropriately set according to the operating capability of the air conditioner AC, the maximum power generated by the solar battery 1, etc.

Zone A through zone C are set using P3, P2, and P1 as shown FIG. 14. Appropriate differentials are also set for the decrease and increase of the integrated value P.

In zone A, the demand signal for decreasing the operating maximum current to two thirds of the preset value is sent to the heat source side unit 4; in zone B, the demand signal for decreasing the operating maximum current to a half of the preset value is sent to the heat source side unit 4; and in zone C, the demand signal for decreasing the operating maximum current to one third of the preset value is sent to the heat source side unit 4.

If the integrated value does not fall in any of these zones, then the demand is cleared. Such demand signals are valid when the demanding function of the air conditioner AC has been set in a valid manner.

Carrying out the control as described above makes it possible to control the power consumed by the air conditioner AC to stay within the power generated by the solar battery 1 when it is averaged on an annual basis. Specifically, the power generated on days when the air conditioner AC need not to be operated and the surplus power obtained when operating the air conditioner AC on smaller power are integrated, and the cumulative power is used when the air conditioning operation is necessary, thus controlling the power consumed by the air conditioner AC to stay within the power generated by the solar battery 1.

In other words, the integrated values of the power indicate the power sold to the system; operating the air conditioner AC on the power within the sold power substantially saves the cost for air conditioning. This means that utilizing the sold power allows the system to be used as equipment for accumulating power, thus permitting almost full use of the solar battery 1.

Figure 15:
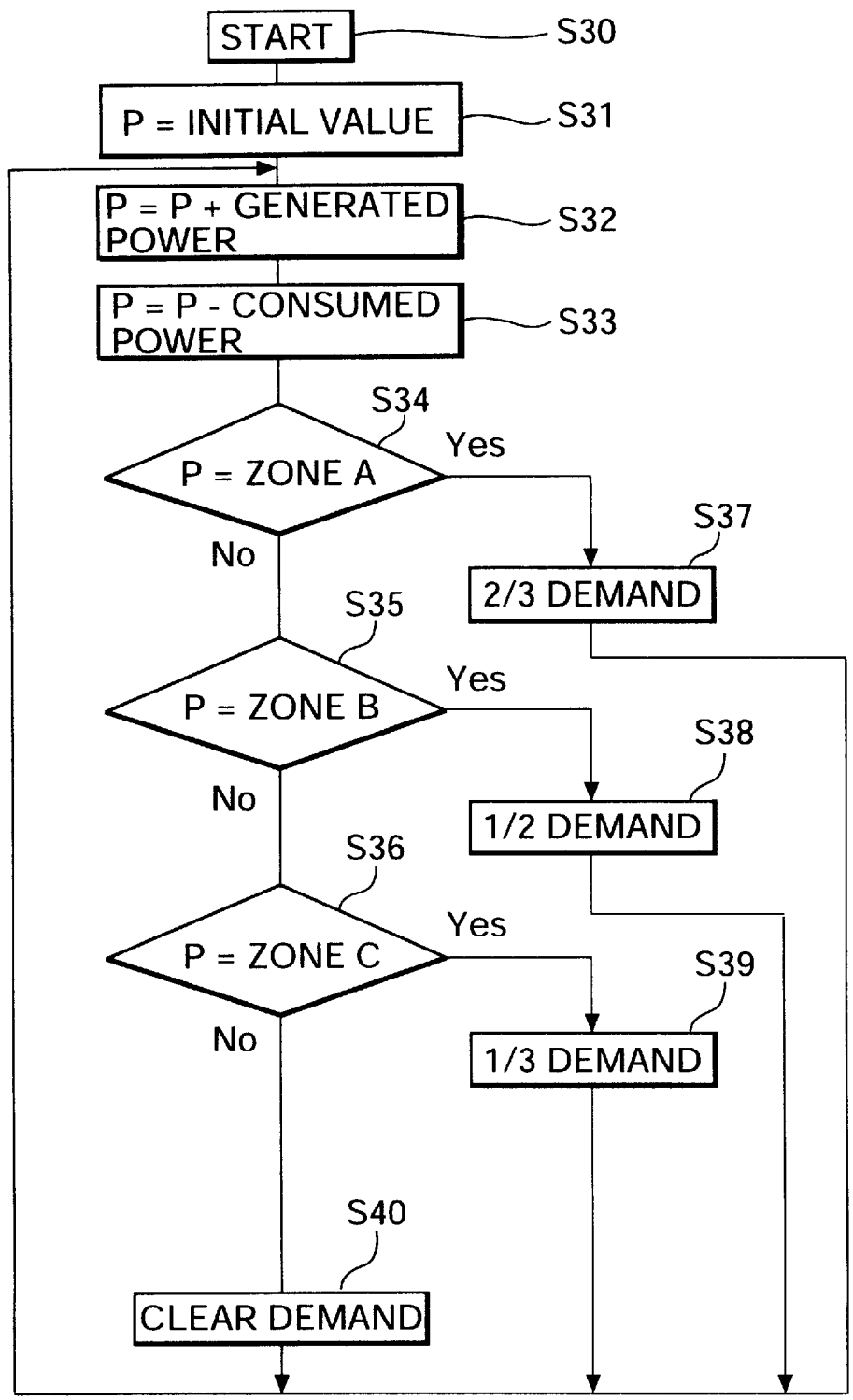
FIG. 15 is a flowchart illustrative of a procedure of demand control.

FIG. 15 shows a flowchart indicative of the procedure for performing the demand control; when the system-interconnected generator 10 is started in a step S30, the integrated value P is set to an initial value. This initial value can be selected by switches; choices for the initial value primarily include the value indicating the power consumed by the air conditioner AC over a period of ten days, the value indicating the power consumed by the air conditioner AC over a period of seven days, the value indicating the power consumed by the air conditioner AC over a period of five days, and the value indicating the power consumed by the air conditioner AC over a period of three days. An appropriate one among these initial values is selected according to the season when the system-interconnected generator 10 is installed or the operation thereof is begun. Preferably, a larger initial value is set in a hot season and a cold season when more power is consumed, while a smaller initial value is set for a season of moderate temperatures; the initial value may alternatively be set to the same value throughout the year.

In a step S32, the power generated by the solar battery 1 is added to the integrated value P, and in a step S33, the power consumed by the air conditioner AC is subtracted from the integrated value P to determine the integrated value used for the control.

In steps S34 through S36, the microprocessor determines in which zone among the zones A through C the integrated value P lies. If the integrated value P is in the zone A, then the microprocessor proceeds to a step S37 to issue a demand signal to the heat source side unit 4 of the air conditioner AC so as to decrease the set value of current control to two thirds thereof; if the integrated value P is in the zone B, then the microprocessor proceeds to a step S38 to issue a demand signal to the heat source side unit 4 of the air conditioner AC so as to decrease the set value of current control to a half thereof; if the integrated value P is in the zone B then the microprocessor proceeds to a step S39 to issue a demand signal to the heat source side unit 4 of the air conditioner AC so as to decrease the set value of current control to one third thereof; and if the integrated value P does not lie in any of the zones A through C, then the microprocessor proceeds to a step S40 to issue a signal for resetting the set value for controlling currents to the heat source side unit 4 of the air conditioner.

Figure 16:
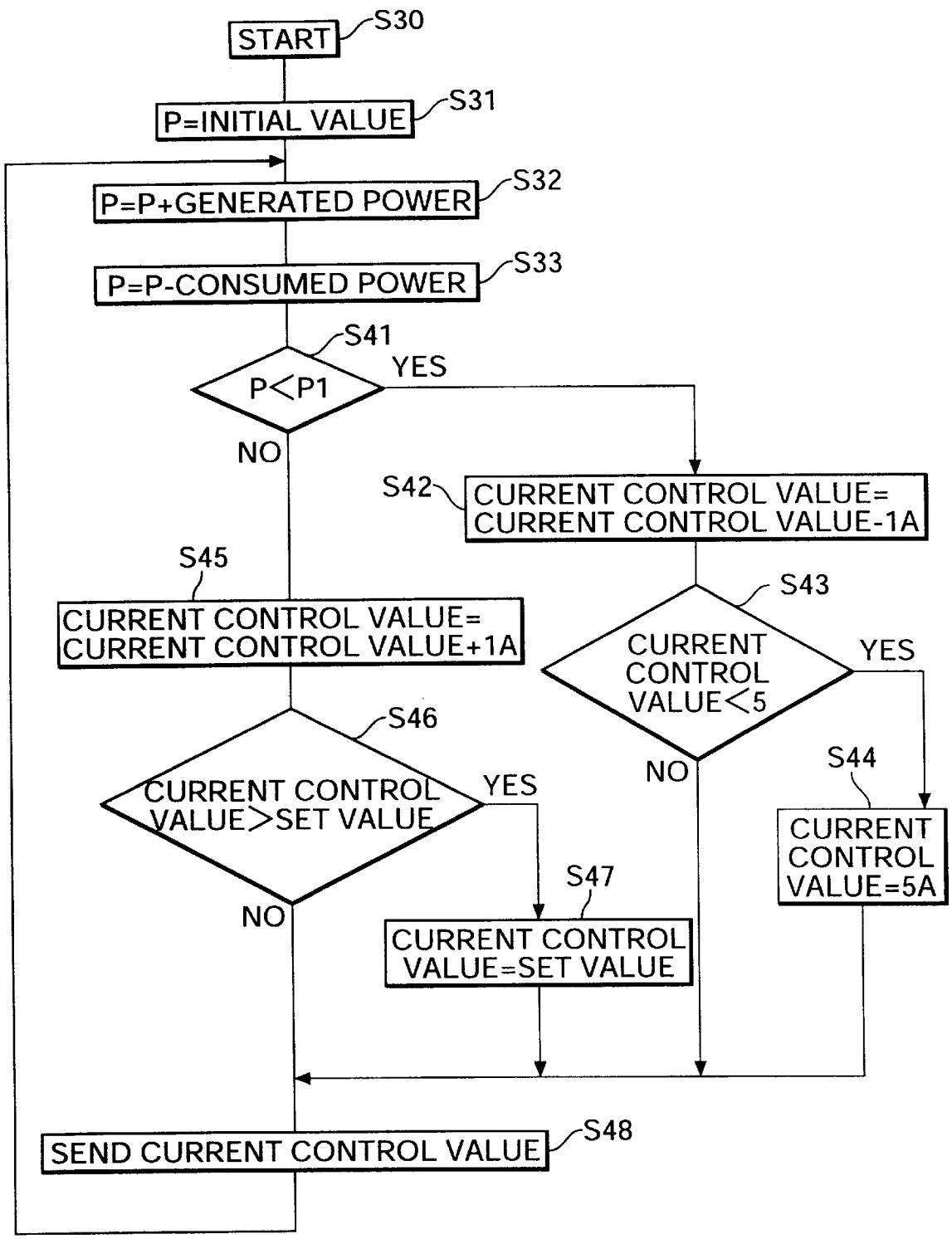
FIG. 16 is a flowchart illustrative of another embodiment of the demand control.

FIG. 16 shows a flowchart of another embodiment wherein the set value for current control is changed according as whether the integrated value P exceeds P1 or not.

The same operations as those indicated by the flowchart shown in FIG. 15 are assigned the same step numbers and the descriptions thereof will be omitted. Firstly, in a step S41, the microprocessor judges whether the integrated value P exceeds P1, and if P<P1, then it sets in a step S42, as an updated current control value, the value obtained by subtracting a value corresponding to 1 ampere from the set current value for current control, i.e. the current control value, obtained from the heat source side unit 4.

If the microprocessor decides in a step S43 that the current control value is smaller than 5, then it sets the current control value equal to 5 A in a step S44 so that it does not go down lower than 5 A. This lower limit value is set to an optional appropriate value.

If the condition, P<P1, is not satisfied in the step S41, then the microprocessor sets in a step S45, as an updated current control value, the value obtained by adding a value corresponding to 1 ampere to the set current value for current control, i.e. the current control value, obtained from the heat source side unit 4. If the microprocessor judges in a step S46 that the current control value is greater than the set value (the set value is the current control value initially set in the heat source side unit 4, that is, the value set by the user side unit 3), then the microprocessor sets the current control value equal to the set value in a step S47 so that the current control value does not exceed the set value.

In a step S48, the current control value thus set is sent to the heat source side unit 4 to control the operating capability of the heat source side unit 4.

As an alternative, only the judgement result of the step S41 may be sent to the heat source side unit 4 so that the heat source side unit 4 may take care of the steps S42 through S47. In this case, the heat source side unit 4 is required to have the function for implementing the steps.

The description given above has referred to the interconnection between the system-interconnected generator 10 and the air conditioner AC. The present invention, however, is not limited thereto; it may also be applied to various other equipment having the demanding function.

For instance, in the embodiment, the system-interconnected generator 10 is separated from the air conditioner AC; however, if the system-interconnected generator is dedicated for the air conditioner, then it may be constructed integrally with the air conditioner.

When applying the present invention to equipment which is not provided with the demanding function, the equipment is to be connected to an adapter for turning ON/OFF the supply of power so as to turn the equipment ON/OFF through the adapter. At this time, the demanding function directly corresponds to the ON/OFF states of the equipment; the currents consumed by the equipment may be detected through the adapter, or a close value may be selected among the values which have been preset in the adapter.

Figure 17:
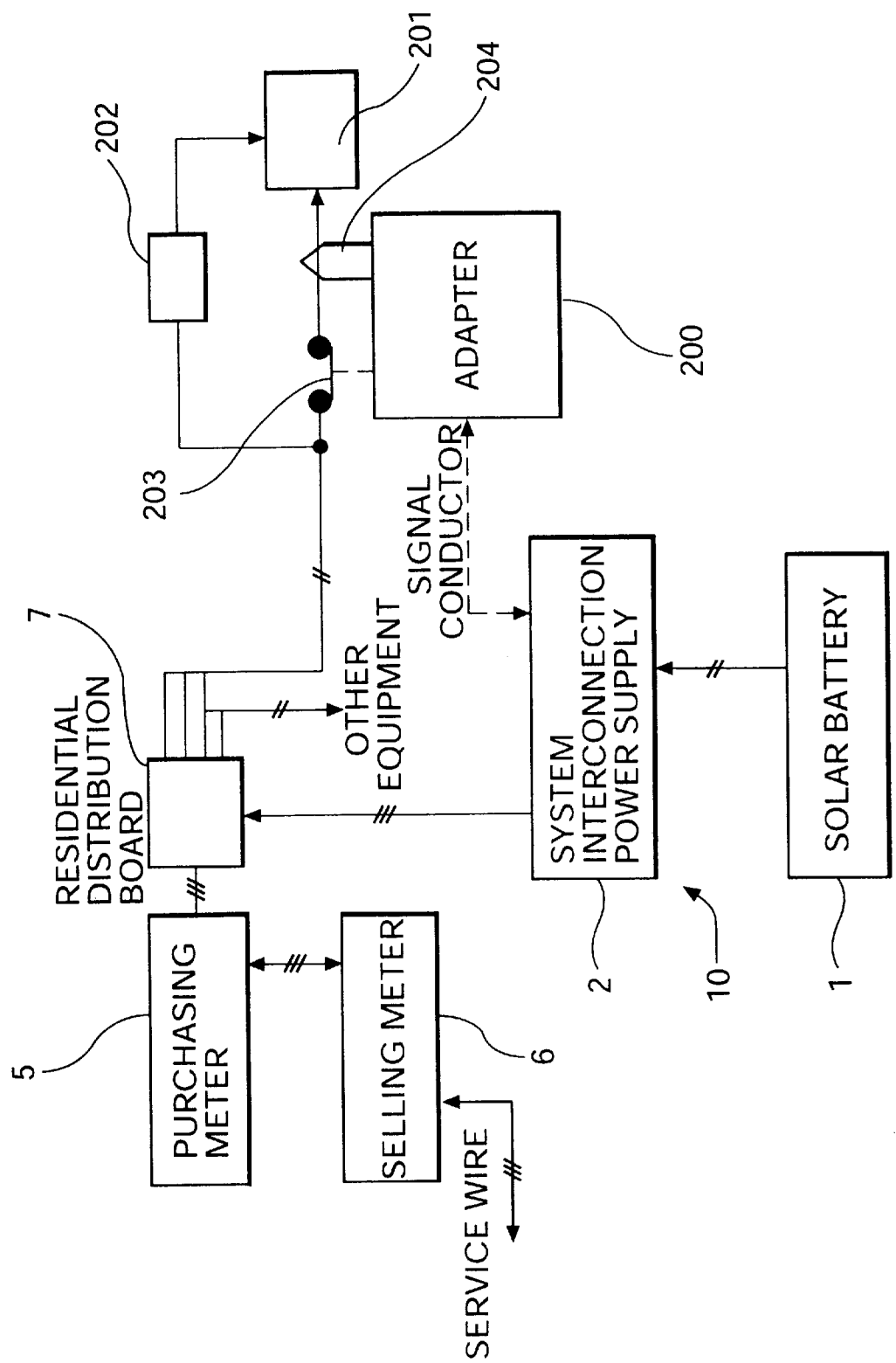
FIG. 17 is a schematic diagram showing a relationship between the system-interconnected generator in accordance with the present invention and other equipment.

FIG. 17 illustrates still another embodiment; the same constituent elements as those shown in FIG. 1 will be assigned the same reference numerals. The embodiment shown in FIG. 17 has an adapter 200, equipment 201, a timer 202, a normally closed armature 203 which is opened and closed by the adapter, and a current detector 204 for detecting the currents flowing through the equipment.

The equipment 201 is, for example, a ventilating fan installed in an attic or under a floor, or in a house or space not in use for an extended period of time. The driving power for the equipment is supplied from the residential distribution board 7 via the normally closed armature 203.

The timer 202 issues an operating signal to the ventilating fan 201 to actuate the ventilating fan 201 for a predetermined period of time at a predetermined cycle or a predetermined time.

The adapter 200 judges whether the ventilating fan 201 is ON or OFF through the current detector 204 and also detects the currents consumed by the ventilating fan 201 and reports it to the system interconnection power supply 2 of the system-interconnected generator 10. The adapter 200 opens or closes the normally closed armature 203 in response to the demand signals received from the system-interconnected generator 10.

In the equipment thus configured, the ventilating fan 201 is operated for the predetermined period of time at the predetermined intervals as long as there is integrated power provided by the solar battery 1.

More specifically, the ventilating fan is operated substantially by the solar battery only, thus obviating the need for purchasing power from the system.

The equipment is not limited to the ventilating fan; any other equipment may be used as long as it is compatible with such an adapter.

Figure 18:
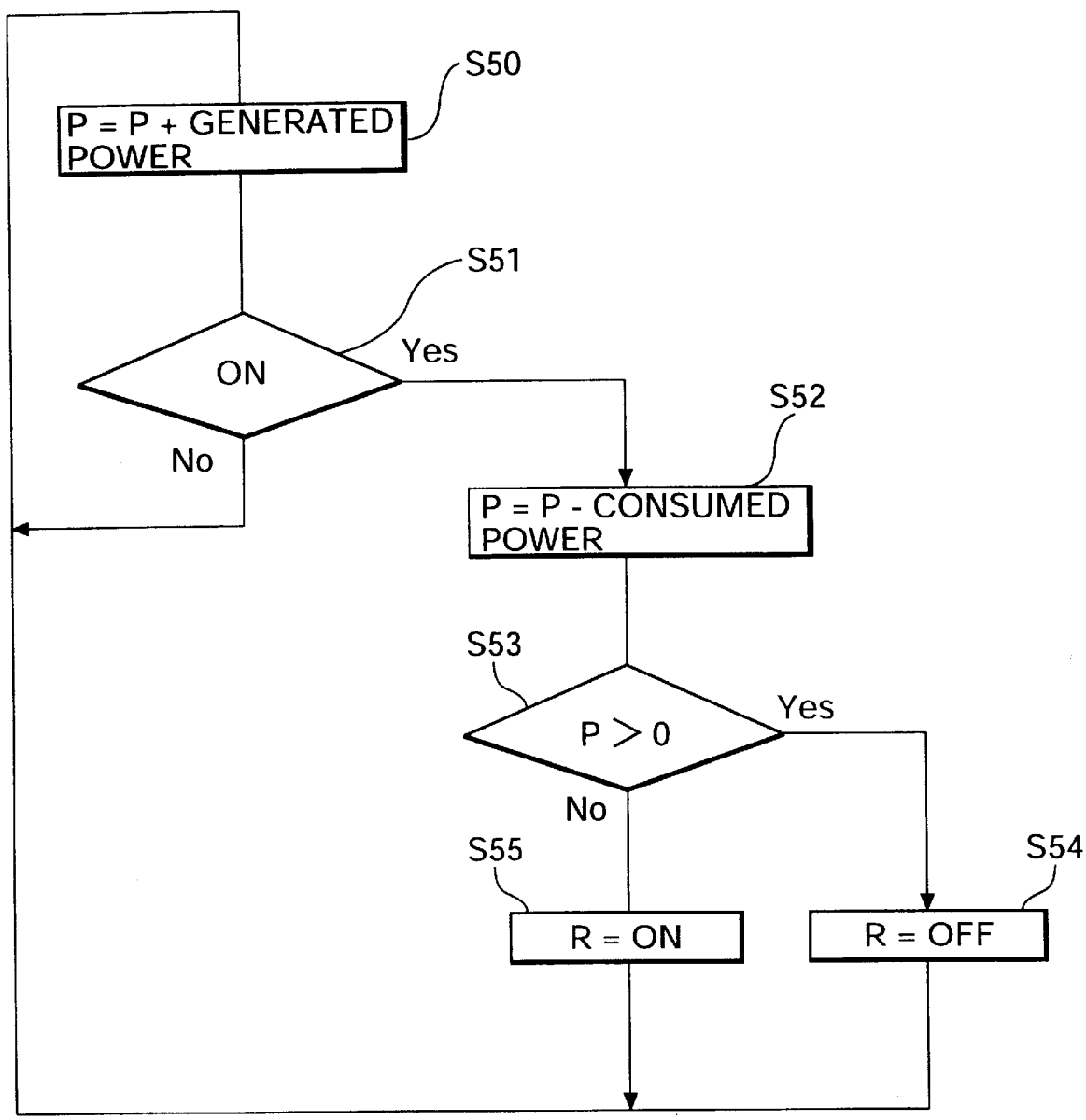
FIG. 18 is a flowchart illustrative of a primary operation of an adapter and the system-interconnected generator.

FIG. 18 shows a flowchart indicative of the main operations of the adapter 200 and the system-interconnected generator 10. In this flowchart, the amount of power generated by the solar battery 1 is integrated to obtain the integrated value P in a step S50. In the following step S51, it is judged whether the ventilating fan 201 is running or not. This judgment is performed by determining whether the adapter 200 has detected the currents flowing through the ventilating fan 201, that is, whether the currents of a predetermined level or higher have flown. If it has been decided that the ventilating fan 201 is not operating, then the microprocessor goes back to the step S50 to integrate the generated power.

If the microprocessor has determined that the ventilating fan 201 is operating, then it proceeds to a step S52 wherein it calculates the power consumed by the ventilating fan 201 from the currents consumed by the ventilating fan 201 which is received from the adapter 200, and it subtracts the calculated consumed power from the integrated value P.

Then, in a step S53, the microprocessor judges whether the integrated value is greater than zero (P>0); if the judgement result is affirmative, then it proceeds to a step S54 wherein it prevents an auxiliary relay from being actuated so as to hold the normally closed armature 203 in the closed state, thereby allowing the ventilating fan 201 to operate. If the condition (P>0) is not satisfied, then the microprocessor goes forward to a step S55 wherein it actuates the auxiliary relay to open the normally closed armature 203 to stop the ventilating fan 201.

The microprocessor then goes back to the step S50 to repeat integrating the generated power.

Thus, according to the present invention, the demanding function of the equipment is enabled according to the integrated value of the power generated by the solar battery and the power consumed by the equipment so as to control the power from the system consumed by the equipment.

Further according to the present invention, the demanding function is implemented in a plurality of steps according to the decrease in the integrated value, permitting restrained variation of the capability of the equipment caused when the demanding function is implemented.

In addition, according to the present invention, by providing the equipment with a minimum operation capability, the equipment can be operated at a minimum capability thereof while the demanding function is being implemented. The power consumed during the operation at the minimum capability is stored when the integrated value turns to a negative value, which is made up for when surplus power is generated by the solar battery. This makes it possible to control the power consumed by the equipment to the power generated by the solar battery throughout the year.

Furthermore, according to the present invention, the demanding function of the equipment is effected according to the integrated value of the power generated by the solar battery and the power consumed by the equipment so as to control the power from the system consumed by the equipment.

According to the present invention, the operation of the equipment is controlled according as whether the integrated value of the power generated by the solar battery exceeds zero; therefore, a substantial demand effect can be achieved even for equipment, which is not provided with the demanding function, by repeatedly turning it ON/OFF.

Moreover, according to the present invention, when equipment is automatically operated at predetermined intervals, it is possible to control the power consumed by the equipment within the power generated by the solar battery throughout the year.

What is claimed is:

1. A system-interconnected generator having a power converter for converting solar energy to AC power and supplying the AC power to a system on a commercial AC power supply to sell the power to the system, said system-interconnected generator comprising:

a storing section for storing the value of the total amount of the AC power which has been converted from solar energy by said power converter;

a correcting section for subtracting a value of power which is consumed by electric equipment receiving power supplied from said system from the total amount value stored in said storing section; and a demanding section for enabling a demanding function of said electric equipment when the total amount value stored in said storing section becomes smaller than a predetermined value.

2. A system-interconnected generator having a power converter for converting solar energy to AC power and supplying the AC power to a system on a commercial AC power supply to sell the power to the system, said system-interconnected generator comprising:

a storing section for storing the value of the total accumulated amount of AC power which has been converted from solar energy by said power converter;

a correcting section for subtracting a value of power which is consumed by electric equipment receiving power supplied from said system from the total amount value stored in said storing section; and a demanding section for issuing a demand signal to said electric equipment each time the total amount value stored in said storing section becomes smaller than any one of a plurality of preset values.

3. A system-interconnected generator having a power converter for converting solar energy to AC power and supplying the AC power to a system on a commercial AC power supply so as to sell the power to the system, said system-interconnected generator comprising:

a storing section for storing the value of the total accumulated amount of AC power which has been converted from solar energy by said power converter;

a correcting section for subtracting a value of power which is consumed by an air conditioner receiving power supplied from said system from the total amount value stored in said storing section; and a demanding section for issuing a signal to the air conditioner to lower the operating capability thereof in steps within a range which exceeds a preset operating capability of the air conditioner each time the total amount value stored in said storing section becomes smaller than any one of a plurality of preset values.

4. A system-interconnected generator having a power converter for converting solar energy to AC power and supplying the AC power to a system on a commercial AC power supply, said system-interconnected generator comprising:

a storing section for storing the value of the total accumulated amount of AC power which has been converted from solar energy by said power converter;

a correcting section for subtracting a value of power which is consumed by electric equipment receiving power supplied from said system, from the total amount value stored in said storing section; and a demanding section for enabling a demanding function of said electric equipment when the total amount value stored in said storing section becomes smaller than a predetermined value.

5. A system-interconnected generator having a power converter for converting solar energy to AC power and supplying the converted AC power to a system on a commercial AC power supply to sell the power to the system, said system-interconnected generator comprising:

a storing section for storing the value of the total amount of the power which has been sold to the system out of the AC power converted from the solar energy by said power converter;

a correcting section for subtracting a value of power which is consumed by electric equipment receiving power supplied from said system from the total amount value stored in said storing section; and a controller which enables the operation of said electric equipment while the total amount value stored in said storing section is greater than zero.

6. (Amended) A system-interconnected generator according to claim 5, wherein the operation of said electric equipment is started at a predetermined cycle if said total amount value is greater than zero.

* * * * *